(12) United States Patent (10) Patent No.: US 8,788,676 B2
Alameh et al. (45) Date of Patent: Jul. 22, 2014

(54) METHOD AND SYSTEM FOR CONTROLLING DATA TRANSMISSION TO OR FROM A MOBILE DEVICE

(75) Inventors: Rachid Alameh, Crystal Lake, IL (US);
Thomas Merrell, Beach Park, IL (US);
William Hede, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 258 days.

(21) Appl. No.: 12/646,199

(22) Filed: Dec. 23, 2009

(65) Prior Publication Data

US 2010/0299390 A1 Nov. 25, 2010

Related U.S. Application Data

(63) Continuation-in-part of application No. 12/471,062, filed on May 22, 2009, now Pat. No. 8,304,733.

(51) Int. Cl.
*G06F 15/16* (2006.01)
*G06F 3/03* (2006.01)
*G06F 3/01* (2006.01)

(52) U.S. Cl.
CPC ............ *G06F 3/0304* (2013.01); *G06F 3/0325* (2013.01); *G06F 3/017* (2013.01)
USPC ............................. 709/227; 709/203; 709/250

(58) Field of Classification Search
USPC .......................................................... 709/227
See application file for complete search history.

(56) References Cited

U.S. PATENT DOCUMENTS 4,286,289 A 8/1981 Ottesen et al.
4,806,709 A 2/1989 Evans
(Continued)

FOREIGN PATENT DOCUMENTS

CN 1407506 A 4/2003
CN 101305337 A 11/2008
(Continued)

OTHER PUBLICATIONS

McKenna, Michael. "Interactive Viewpoint Control and Three-Dimensional Operations," Proceedings of the 1992 Symposium on Interactive 3D Graphics, 1992, pp. 53-56.*

(Continued)

*Primary Examiner* — Melvin H Pollack
(74) *Attorney, Agent, or Firm* — Whyte Hirschboeck Dudek, S.C.; Sylvia Chen

(57) ABSTRACT

Methods of operating mobile or other electronic devices so as to achieve a transmission of data between those devices, and related systems and components, are described. In one exemplary embodiment, a method of operating a first mobile device so as to achieve a transmission of data from the mobile device to an additional electronic device includes tracking a positional variation of an object situated proximate a display screen of the mobile device by determining locations of the object over time using a sensing assembly of the mobile device. The method further includes determining a point or region on the display screen based upon the tracked positional variation of the object, identifying an image portion corresponding to the point or region, where the data is associated with the image portion, and transmitting the data from the mobile device, whereby the data is capable of being received by the additional electronic device.

21 Claims, 15 Drawing Sheets

(56) References Cited

U.S. PATENT DOCUMENTS

| | | | |
|---|---|---|---|
| 4,914,624 A | 4/1990 | Dunthorn | |
| 4,967,083 A | 10/1990 | Kornbrekke et al. | |
| 5,179,369 A | 1/1993 | Person et al. | |
| 5,414,413 A | 5/1995 | Tamaru et al. | |
| 5,684,294 A | 11/1997 | Kouhi | |
| 5,781,662 A | 7/1998 | Mori et al. | |
| 5,793,486 A * | 8/1998 | Gordon et al. | 356/328 |
| 5,821,521 A | 10/1998 | Bridgelall et al. | |
| 5,945,988 A | 8/1999 | Williams et al. | |
| 6,002,427 A | 12/1999 | Kipust | |
| 6,107,994 A | 8/2000 | Harada et al. | |
| 6,147,677 A * | 11/2000 | Escobosa et al. | 345/158 |
| 6,184,538 B1 | 2/2001 | Bandara et al. | |
| 6,185,950 B1 * | 2/2001 | Baruschke et al. | 62/244 |
| 6,215,116 B1 | 4/2001 | Van Marcke | |
| 6,246,407 B1 | 6/2001 | Wilks et al. | |
| 6,246,862 B1 | 6/2001 | Grivas | |
| 6,292,674 B1 | 9/2001 | Davis | |
| 6,330,457 B1 | 12/2001 | Yoon | |
| 6,438,752 B1 | 8/2002 | McClard | |
| 6,460,183 B1 | 10/2002 | Van Der Vleuten | |
| 6,517,257 B2 * | 2/2003 | Nishikawa et al. | 385/88 |
| 6,525,854 B1 | 2/2003 | Takahashi et al. | |
| 6,666,081 B1 * | 12/2003 | Babinsky et al. | 73/170.01 |
| 6,681,056 B1 * | 1/2004 | Tseng et al. | 382/282 |
| 6,721,954 B1 | 4/2004 | Nickum | |
| 6,804,012 B2 | 10/2004 | Gombert | |
| 6,816,154 B2 | 11/2004 | Wong et al. | |
| 6,925,413 B2 * | 8/2005 | Krieg et al. | 702/152 |
| 6,933,922 B2 | 8/2005 | Casebolt et al. | |
| 6,941,161 B1 | 9/2005 | Bobisuthi et al. | |
| 7,012,637 B1 * | 3/2006 | Blume et al. | 348/218.1 |
| 7,046,230 B2 | 5/2006 | Zadesky et al. | |
| 7,134,092 B2 | 11/2006 | Fung et al. | |
| 7,166,966 B2 | 1/2007 | Naugler, Jr. et al. | |
| 7,212,835 B2 | 5/2007 | Mantyjarvi et al. | |
| 7,220,958 B2 * | 5/2007 | Kitamura et al. | 250/221 |
| 7,224,382 B2 * | 5/2007 | Baker | 348/46 |
| 7,237,929 B2 * | 7/2007 | Stahl | 362/297 |
| 7,324,671 B2 * | 1/2008 | Li et al. | 382/118 |
| 7,339,580 B2 | 3/2008 | Westerman et al. | |
| 7,340,077 B2 | 3/2008 | Gorturk et al. | |
| 7,368,703 B2 | 5/2008 | De Samber et al. | |
| 7,380,716 B2 | 6/2008 | Yokoyama | |
| 7,468,689 B2 | 12/2008 | Ma et al. | |
| 7,486,386 B1 | 2/2009 | Holcombe et al. | |
| 7,489,297 B2 | 2/2009 | Hohmann et al. | |
| 7,515,177 B2 * | 4/2009 | Yoshikawa | 348/218.1 |
| 7,519,918 B2 | 4/2009 | Trantow | |
| 7,532,196 B2 | 5/2009 | Hinckley | |
| 7,534,988 B2 | 5/2009 | Kong et al. | |
| 7,557,965 B2 * | 7/2009 | Taylor et al. | 358/474 |
| 7,561,146 B1 | 7/2009 | Hotelling | |
| 7,630,716 B2 | 12/2009 | Tamura et al. | |
| 7,687,774 B2 * | 3/2010 | Ohta et al. | 250/338.1 |
| 7,688,283 B2 * | 3/2010 | Jung et al. | 345/32 |
| 7,715,723 B2 | 5/2010 | Kagawa et al. | |
| 7,721,310 B2 | 5/2010 | Schaffer et al. | |
| 7,728,958 B2 * | 6/2010 | Pfaff | 356/35.5 |
| 7,795,584 B2 * | 9/2010 | Mok et al. | 250/338.1 |
| 7,814,791 B2 * | 10/2010 | Andersson et al. | 73/504.03 |
| 7,855,716 B2 | 12/2010 | McCreary et al. | |
| 7,912,376 B2 * | 3/2011 | Rollins | 398/140 |
| 7,967,451 B2 * | 6/2011 | Chen et al. | 353/98 |
| 7,971,156 B2 * | 6/2011 | Albertson et al. | 715/863 |
| 7,991,575 B2 * | 8/2011 | Vogel et al. | 702/151 |
| 7,991,896 B2 * | 8/2011 | Shen et al. | 709/227 |
| 7,994,468 B2 | 8/2011 | Duijve et al. | |
| 8,006,002 B2 * | 8/2011 | Kalayjian et al. | 710/36 |
| 8,013,904 B2 * | 9/2011 | Tan et al. | 348/222.1 |
| 8,018,501 B2 * | 9/2011 | Sasaki | 348/223.1 |
| 8,023,061 B2 * | 9/2011 | Ra | 349/58 |
| 8,072,469 B2 * | 12/2011 | Ottney | 345/629 |
| 8,104,113 B2 * | 1/2012 | Rodenbeck et al. | 4/623 |
| 2001/0019338 A1 | 9/2001 | Roth | |
| 2002/0104081 A1 | 8/2002 | Candelore et al. | |
| 2002/0122072 A1 | 9/2002 | Selker | |
| 2002/0199186 A1 | 12/2002 | Ali et al. | |
| 2003/0034439 A1 | 2/2003 | Reime et al. | |
| 2003/0063128 A1 | 4/2003 | Salmimaa et al. | |
| 2003/0222917 A1 | 12/2003 | Trantow | |
| 2004/0207997 A1 * | 10/2004 | Stewart et al. | 362/31 |
| 2005/0104860 A1 | 5/2005 | McCreary et al. | |
| 2005/0150697 A1 | 7/2005 | Altman et al. | |
| 2005/0198029 A1 | 9/2005 | Pohja et al. | |
| 2005/0232447 A1 | 10/2005 | Shinozuka et al. | |
| 2005/0289182 A1 | 12/2005 | Pandian et al. | |
| 2006/0010400 A1 | 1/2006 | Dehlin et al. | |
| 2006/0028453 A1 | 2/2006 | Kawabe | |
| 2006/0031786 A1 | 2/2006 | Hillis et al. | |
| 2006/0059152 A1 | 3/2006 | Nakamura | |
| 2006/0067573 A1 * | 3/2006 | Parr et al. | 382/154 |
| 2006/0125799 A1 | 6/2006 | Hillis et al. | |
| 2006/0132456 A1 | 6/2006 | Anson | |
| 2006/0161870 A1 | 7/2006 | Hotelling et al. | |
| 2006/0161871 A1 | 7/2006 | Hotelling et al. | |
| 2006/0256074 A1 | 11/2006 | Krum et al. | |
| 2007/0058255 A1 * | 3/2007 | Imai et al. | 359/566 |
| 2007/0109266 A1 | 5/2007 | Davis et al. | |
| 2007/0137462 A1 | 6/2007 | Barros et al. | |
| 2007/0177803 A1 | 8/2007 | Elias et al. | |
| 2007/0180392 A1 | 8/2007 | Russo | |
| 2007/0220437 A1 | 9/2007 | Boillot | |
| 2007/0247643 A1 | 10/2007 | Nakamura et al. | |
| 2008/0005702 A1 | 1/2008 | Radivojevic et al. | |
| 2008/0006762 A1 | 1/2008 | Fadell et al. | |
| 2008/0024454 A1 | 1/2008 | Everest | |
| 2008/0052643 A1 | 2/2008 | Ike et al. | |
| 2008/0079902 A1 | 4/2008 | Mandelstam-Manor et al. | |
| 2008/0100928 A1 * | 5/2008 | Wilson | 359/725 |
| 2008/0122803 A1 | 5/2008 | Izadi et al. | |
| 2008/0129688 A1 | 6/2008 | Richardson et al. | |
| 2008/0161870 A1 | 7/2008 | Gunderson | |
| 2008/0165140 A1 | 7/2008 | Christie et al. | |
| 2008/0192005 A1 | 8/2008 | Elgoyhen et al. | |
| 2008/0195735 A1 | 8/2008 | Hodges et al. | |
| 2008/0204427 A1 | 8/2008 | Heesemans et al. | |
| 2008/0211771 A1 | 9/2008 | Richardson | |
| 2008/0219672 A1 | 9/2008 | Tam et al. | |
| 2008/0225041 A1 | 9/2008 | El Dokor et al. | |
| 2008/0240568 A1 | 10/2008 | Tonouchi | |
| 2008/0252595 A1 | 10/2008 | Boillot | |
| 2008/0256494 A1 | 10/2008 | Greenfield | |
| 2008/0259053 A1 | 10/2008 | Newton | |
| 2008/0266083 A1 | 10/2008 | Midholt et al. | |
| 2008/0280642 A1 | 11/2008 | Coxhill et al. | |
| 2008/0284738 A1 | 11/2008 | Hovden et al. | |
| 2008/0297487 A1 | 12/2008 | Hotelling et al. | |
| 2008/0303681 A1 | 12/2008 | Herz et al. | |
| 2008/0309641 A1 | 12/2008 | Harel et al. | |
| 2009/0021488 A1 | 1/2009 | Kali et al. | |
| 2009/0031258 A1 | 1/2009 | Arrasvouri et al. | |
| 2009/0061823 A1 | 3/2009 | Chu | |
| 2009/0092284 A1 | 4/2009 | Breed et al. | |
| 2009/0158203 A1 | 6/2009 | Kerr et al. | |
| 2009/0277697 A1 | 11/2009 | Bolt et al. | |
| 2009/0299633 A1 | 12/2009 | Hawes et al. | |
| 2009/0303176 A1 | 12/2009 | Chen et al. | |
| 2011/0009194 A1 | 1/2011 | Gabai et al. | |
| 2012/0046906 A1 | 2/2012 | Alameh et al. | |

FOREIGN PATENT DOCUMENTS

| | | | |
|---|---|---|---|
| EP | 1445922 A1 | | 8/2004 |
| EP | 1553427 A1 * | | 7/2005 |
| EP | 1657819 A2 | | 5/2006 |
| EP | 1760573 A2 | | 3/2007 |
| EP | 2000896 A2 | | 12/2008 |
| EP | 2037349 A2 | | 3/2009 |
| JP | 02280427 A | | 11/1990 |
| JP | 2005293419 A | | 10/2005 |
| JP | 2006010489 A | | 1/2006 |
| JP | 2007042020 A | | 2/2007 |
| JP | 2009085799 A | | 4/2009 |

(56) References Cited

FOREIGN PATENT DOCUMENTS

| KR | 1020030044749 A | 6/2003 |
| KR | 1020050100642 A | 10/2005 |
| WO | 9528777 A1 | 10/1995 |
| WO | 0241129 A2 | 5/2002 |
| WO | 03023701 A2 | 3/2003 |
| WO | 03076870 A1 | 9/2003 |
| WO | 2005076542 A1 | 8/2005 |
| WO | 2005101176 A2 | 10/2005 |
| WO | 2008016394 A2 | 2/2008 |
| WO | 2008073289 A3 | 6/2008 |

OTHER PUBLICATIONS

United States Patent and Trademark Office, "Non-Final Rejection" for U.S. Appl. No. 12/471,062, Oct. 4, 2011, 17 pages.
United States Patent and Trademark Office, "Non-Final Rejection" for U.S. Appl. No. 12/428,187, Oct. 26, 2011, 27 pages.
United States Patent and Trademark Office, "Non-Final Rejection" for U.S. Appl. No. 12/640,867, Sep. 30, 2011, 11 pages.
U.S. Patent and Trademark Office, "Notice of Allowance" for U.S. Appl. No. 12/344,760, Jan. 3, 2011, 9 pages.
Patent Cooperation Treaty, "PCT Search Report and Written Opinion of the International Searching Authority" for International Application No. PCT/US2010/030964, Nov. 9, 2010, 24 pages.
Patent Cooperation Treaty, "PCT Search Report and Written Opinion of the International Searching Authority" for International Application No. PCT/US2010/033472, Dec. 15, 2010, 9 pages.
G.Yun and M.Kavehrad, "Spot diffusing and fly-eye receivers for indoor infrared wireless communications", Proc. 1992 IEEE, Conf. Sel, Topics in Wireless Comm., Vancouver, BC, Canada, Jun. 25-26, 1992, pp. 286-292.
Kahn, J.M.; You, R., Djahani, P., Weisbin, A.G."Imaging Diversity Receivers for high-speed infrared wireless communication", IEEE Communications Mag., Dec. 1998, Accessed May 7, 2009; 7 pages.
Ward, A.; Jones A.; Hopper A.; "A new location technique for the active office"; IEEE Personal Communications, 1997; accessed May 7, 2009; 11 pages.
Metzger, C.; Anderson, M.; Starner, T.; "FreeDigiter: A contact-free device for gesture control"; Wearable Computers, 2004; ISWC 2004, 8th International Symposium, vol. 1, Oct. 31/Oct. 4, 2004, pp. 18-21.
Von Hardenberg, C.; Berard F.; "Bare-hand human-computer interaction" PUI; ACM 1-58113-448-7 Nov. 14, 2001; Orlando, FL, USA; 8 pages.
TrackIR: Vector Expansion: True 6DOF view control offer 3-dimensional virtual reality via motion control; TrackIR by NaturalPoint; www.naturalpoint.com; 2 pages Aug. 2005.
Bricklin, D.; Gestures, the iPhone, and Standards: A Developer's Questions, www.bricklin.com, 10 pages, 1999-2009.
Gearlog, Microsoft's sidesight: something Apple show watch, www.gearlog.com; 5 pages, 1996-2008, Ziff Davis Publ. Holdings, Inc.
Hadamard transform—Wikipedia definition; http://en.wikipedia.org/wiki/Hadamard_transform; 4 pages, Oct. 2009.
Silicon Laboratories, Inc.; Si1120 Evaluation Kit User's Guide, Austin, TX, Dec. 2009, 10 pages; www.silabs.com/support/pages/contacttechnicalsupport.aspx.
U.S. Appl. No. 12/643,211, filed Dec. 21, 2009; "Electronic device with sensing assembly and method for interpreting consecutive gestures."
U.S. Appl. No. 12/640,867, filed Dec. 17, 2009, "Electronic device with sensing assembly and method for detecting basic gestures."
U.S. Appl. No. 12/646,601, filed Dec. 23, 2009, "Electronic device with sensing assembly and method for detecting gestures of geometric shapes."
U.S. Appl. No. 12/648,503, filed Dec. 29, 2009, "Electronic device with sensing assembly and method for interpreting offset gestures."
U.S. Appl. No. 12/641,830, filed Dec. 18, 2009, "Mobile device with user interaction capability and method of operating same".
U.S. Appl. No. 12/645,244, filed Dec. 22, 2009, "Method and system for conducting communication between mobile devices."
U.S. Appl. No. 12/471,062, filed May 22, 2009, "Sensing assembly for mobile device."
U.S. Appl. No. 12/344,760, filed Dec. 29, 2008, "Portable electronic device having self-calibrating proximity sensors."
U.S. Appl. No. 12/347,146, filed Dec. 31, 2008, "Portable electronic device having directional proximity sensors based on device orientation."
United States Patent and Trademark Office, "Non-Final Rejection" for U.S. Appl. No. 12/645,244, May 24, 2012, 8 pages.
Patent Cooperation Treaty, "PCT Search Report and Written Opinion of the International Searching Authority" for International Application No. PCT/US2009/066555, Jul. 16, 2010, 11 pages.
U.S. Appl. No. 12/428,187, filed Apr. 22, 2009 "Menu Configuration System and Method for Display on an Electronic Device".
U.S. Appl. No. 12/428,266, filed Apr. 22, 2009 "Touch-Screen and Method for an Electronic Device".
U.S. Appl. No. 12/500,625, filed Jul. 10, 2009 "Devices and Methods for Adjusting Proximity Detectors".
Patent Cooperation Treaty, "Notification of Transmittal of the International Search Report and the Written Opinion of the International Searching Authority, or the Declaration" for PCT/US2010/039561, Sep. 30, 2010, pp. 1-13.
Patent Cooperation Treaty, "Notification of Transmittal of the International Search Report and the Written Opinion of the International Searching Authority, or the Declaration" for PCT/US2010/028654, Dec. 1, 2010, pp. 1-22.
Patent Cooperation Treaty, "PCT Search Report and Written Opinion of the International Searching Authority" for International Application No. PCT/US2010/061254, Apr. 7, 2011, 16 pages.
Patent Cooperation Treaty, "PCT Search Report and Written Opinion of the International Searching Authority" for International Application No. PCT/US2010/061261, Mar. 17, 2011, 14 pages.
United States Patent and Trademark Office, "Non-Final Rejection" for U.S. Appl. No. 12/471,062, Apr. 25, 2011, 16 pages.
Vladislav Pavlov et al., "Model-based object characterization with active infrared sensor array," IEEE Sensors Conference, 2007, pp. 360-363.
Henrik V. Christensen, "Retrieval of 3D-position of a Passive Object using Infrared LED's and Photodiodes," International Conference on Acoustics, Speech, and Signal Processing (ICASSP), 2005, pp. IV1093-IV1096.
Specification of the Bluetooth System; Master Table of Contents & Compliance Requirements; Covered Core Package V. 3.0 +HS; Apr. 21, 2009; 192 pages.
United States Patent and Trademark Office, "Non-Final Office Action" for U.S. Appl. No. 12/347,146, Jul. 18, 2011, 9 pages.
United States Patent and Trademark Office, "Non-Final Office Action" for U.S. Appl. No. 12/428,260, Oct. 5, 2011, 10 pages.
United States Patent and Trademark Office, "Final Rejection" for U.S. Appl. No. 12/428,187, Apr. 10, 2012, 10 pages.
United States Patent and Trademark Office, "Final Rejection" for U.S. Appl. No. 12/428,266, Mar. 14, 2012, 9 pages.
United States Patent and Trademark Office, "Final Rejection" for U.S. Appl. No. 12/471,062, Feb. 22, 2012, 15 pages.
Jungsoo Kim et al., "The Gesture Watch: A Wireless Contact-free Gesture based Wrist Interface", 11th IEEE Int'l Symp. on Wearable Computers, 2007, pp. 15-22.
United States Patent and Trademark Office, "Non-Final Rejection" for U.S. Appl. No. 12/646,601, Feb. 14, 2012, 9 pages.
Thad Starner et al., "The Gesture Pendant: A Self-illuminating, Wearable, Infared Computer Vision System for Home Automation Control and Medical Monitoring", 4th IEEE Int'l Symp. on Wearable Computers, 2000, pp. 87-94.
Heinrich Ruser, "Object recognition with a smart low-cost active infared sensor array", 1st Int'l Conf. on Sensing Tech., Nov. 21-23, 2005, pp. 494-499.
United States Patent and Trademark Office, "Final Rejection" for U.S. Appl. No. 12/640,867, Mar. 30, 2012, 11 pages.
United States Patent and Trademark Office, "Non-Final Rejection" for U.S. Appl. No. 12/648,503, Feb. 17, 2012, 7 pages.
United States Patent and Trademark Office, "Notice of Allowance" for U.S. Appl. No. 13/283,984, Dec. 21, 2011, 9 pages.

(56) References Cited

OTHER PUBLICATIONS

United States Patent and Trademark Office, "Non-Final Rejection" for U.S. Appl. No. 12/500,625, Dec. 29, 2011, 30 pages.
United States Patent and Trademark Office, "Non-Final Rejection" for U.S. Appl. No. 12/641,830, Sep. 20, 2012, 8 pages.
United States Patent and Trademark Office, "Non-Final Rejection" for U.S. Appl. No. 12/643,211, Sep. 17, 2012, 8 pages.
The State Intellectual Property Office of the People's Republic of China, "Notification of the First Office Action" for Chinese Patent Application No. 201080022152.1 dated Oct. 25, 2013, 19 pages.

* cited by examiner

METHOD AND SYSTEM FOR CONTROLLING DATA TRANSMISSION TO OR FROM A MOBILE DEVICE

CROSS-REFERENCE TO RELATED APPLICATIONS

This application is a continuation-in-part of and claims the benefit of U.S. patent application Ser. No. 12/471,062, titled "Sensing Assembly For Mobile Device" and filed on May 22, 2009 now U.S. Pat. No. 8,304,733, which is hereby incorporated by reference herein.

STATEMENT REGARDING FEDERALLY SPONSORED RESEARCH OR DEVELOPMENT

FIELD OF THE INVENTION

The present invention relates generally to mobile devices and, more particularly, to methods and systems implemented on mobile devices that facilitate the controlling of the transmission of data to and from those mobile devices.

BACKGROUND OF THE INVENTION

Mobile devices such as cellular telephones, smart phones, and other handheld or portable electronic devices such as personal digital assistants (PDAs), headsets, MP3 players, etc. have become popular and ubiquitous. As supplementary features have been added to mobile devices, there has been an increasing desire to equip mobile devices with input/output mechanisms that accommodate numerous user commands and react to numerous user behaviors. For example, many mobile devices are now equipped not only with buttons or keys/keypads, but also with capacitive touchscreens by which a user is able to communicate, to the mobile device, a variety of messages or instructions simply by touching the surface of the mobile device and moving the user's finger along the surface of the mobile device.

It is of increasing interest that mobile devices be capable of detecting the presence of, and determining with some accuracy the position of, physical objects located outside of the mobile devices and, more particularly, the presence and location of human beings (or portions of their bodies, such as their heads or hands) who are using the mobile devices or otherwise are located nearby the mobile devices. By virtue of such capabilities, the mobile devices are able to adjust their behavior in a variety of manners that are appropriate given the presence (or absence) and location of the human beings and other physical objects.

Although prior art devices such as capacitive touchscreens are useful as input/output devices for phones, such touchscreens are fairly complicated electronic devices that are expensive and require a large number of sensing devices that are distributed in locations across a large surface area of the phone. Also, such touchscreens are limited insofar as they only allow a user to provide input signals if the user is physically touching the touchscreens. Further, while remote sensing devices such as infrared (or, more accurately, near-infrared) transceivers have been employed in the past in some mobile devices to facilitate the detection of the presence and location of human beings and physical objects even when not in physical contact with the mobile devices, such sensing devices have been limited in various respects.

In particular, some such near-infrared transceivers in some such mobile devices are only able to detect the presence or absence of a human being/physical object within a certain distance from the given transceiver (e.g., binarily detect that the human being/physical object is within a predetermined distance or proximity to the transceiver), but not able to detect the three-dimensional location of the human being/physical object in three-dimensional space relative to the transceiver. Also, some such transceivers in some such mobile devices are undesirably complicated or require large numbers of components in order to operate, which in turn renders such devices unduly expensive.

Therefore, for the above reasons, it would be advantageous if a new sensing device or sensing devices suitable for one or more types of mobile devices could be developed that overcame one or more of the above-described limitations, and/or one or more other limitations. It would further be advantageous if, in at least some embodiments, such new sensing device(s) could be utilized to achieve operational enhancements for the mobile device(s) on which the sensing device(s) are implemented.

DETAILED DESCRIPTION

Figure 1:
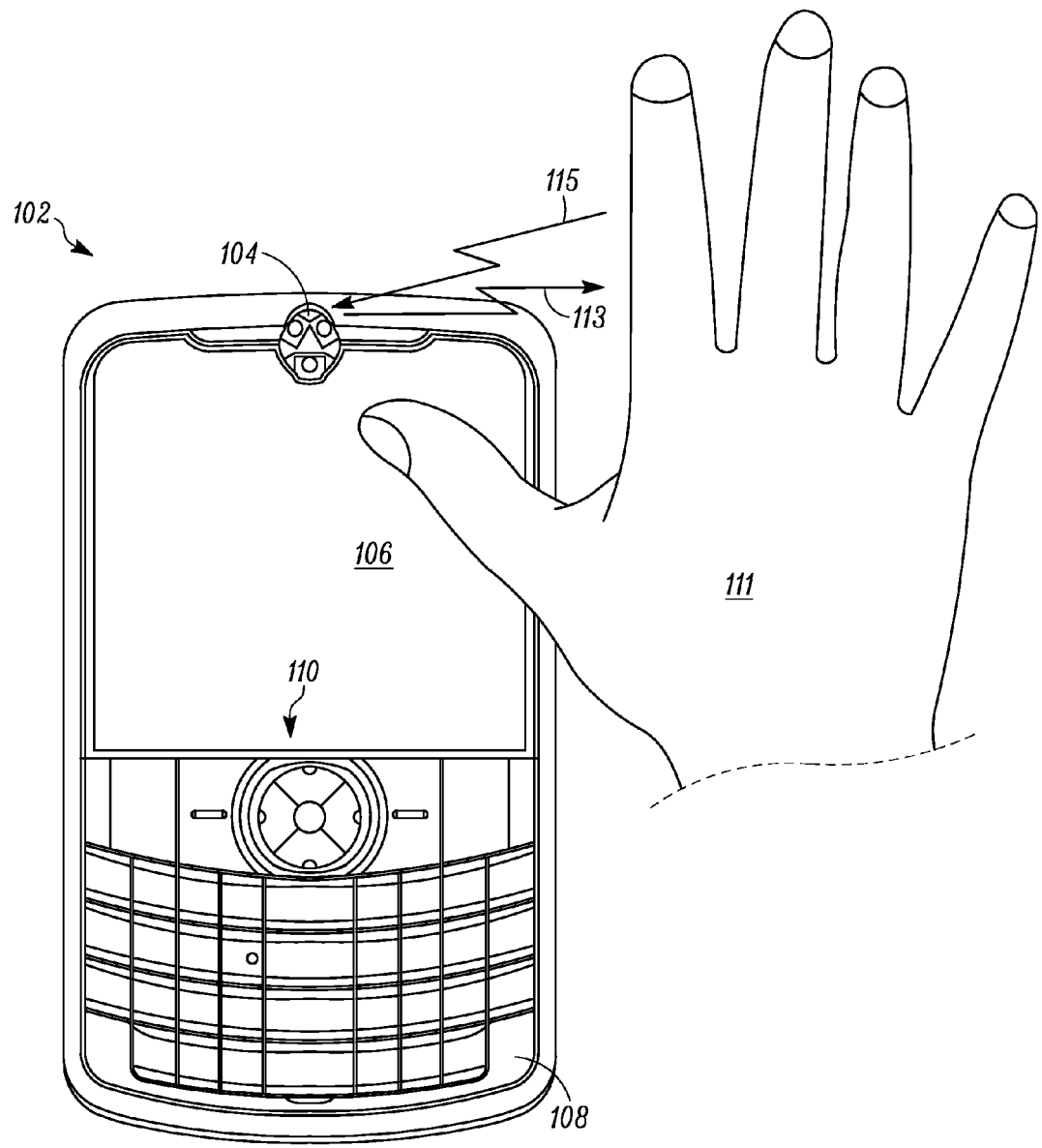
FIG. 1 is a front elevation view of an exemplary mobile device that employs an exemplary pyramid-type sensing assembly capable of allowing sensing of the location of an exemplary external object (shown partially in cut-away), in accordance with one embodiment of the present invention.

Described herein are methods of operating mobile devices and other electronic devices so as to achieve transmissions of data therebetween. In one exemplary embodiment, a method of operating a first mobile device so as to achieve a transmission of data from the first mobile device to an additional electronic device includes tracking a positional variation of a first object situated proximate a display screen of the first mobile device by determining locations of the object over time using a sensing assembly of the first mobile device. The method further includes determining a point or region on the display screen based upon the tracked positional variation of the first object, identifying an image portion corresponding to the point or region, where the data is associated with the image portion, and transmitting the data from the first mobile device, whereby the data is capable of being received by the additional electronic device.

In another exemplary embodiment, a method of operating a first mobile device so as to achieve a transmission of data from the first mobile device to an additional electronic device includes detecting a position or manner of movement of a first object situated proximate a display screen of the first mobile device, where the detecting is performed by way of a pyramidal infrared sensing assembly. The method additionally includes determining a point or region on the display screen, the point or region being determined based upon the detected position or manner of movement of the object, and identifying an image portion corresponding to the point or region, wherein the data is associated with the image portion. The method also includes transmitting an offer signal indicative of an offer by the first mobile device to send the data to the additional electronic device, receiving an acceptance signal, the acceptance signal being indicative of a desire by the additional electronic device to receive the data, and transmitting the data from the first mobile device for receipt by the additional electronic device.

Also described herein are mobile device systems and other systems and components for performing such methods and related methods. For example, in one embodiment, a mobile device includes a sensing assembly that is configured to detect a position or manner of movement of an object proximate the mobile device by determining locations of the object over time, a display screen, and a processor at least indirectly in communication with each of the sensing assembly, the display screen, and a memory device. The processor upon receiving signals from the sensing assembly determines either (a) a correlated point or region of the display screen corresponding to the detected position or manner of movement, and further an image portion displayed on the display screen that is at or near the correlated point or region, or (b) that a data transmission offer should be accepted. The mobile device further either (c) transmits first data available from the mobile device and corresponding to the image portion upon an additional condition being met, or (d) receives second data after sending an acceptance signal upon the determining of (b).

Exemplary components that can be employed by such mobile device systems include, in some embodiments, an infrared sensing assembly that enables detection of a location of an external object. The sensing assembly, in at least one embodiment, includes a pyramid-type housing structure having a central surface and two or more outer surfaces each of which extends in an inclined manner away from the central surface, and first photoelectric devices, each respective first photoelectric device positioned proximate to a respective one of the outer surfaces. The sensing assembly further includes a second photoelectric device that is positioned proximate to the central surface, where either each of the first photoelectric devices is a phototransmitter and the second photoelectric device is a photoreceiver, or vice-versa. Each respective photoelectric device is oriented so as to correspond to the respective surface proximate to which the respective photoelectric device is positioned, and the sensing assembly is operated so that infrared light is communicated between the second photoelectric device and at least two of the first photoelectric devices, whereby the location of the object can be determined based upon the communicated infrared light, which is reflected off of the external object during transit.

In at least one additional embodiment, a mobile device including such an infrared sensing assembly can make a determination as to a location of an external object. In at least one such embodiment the sensing assembly includes at least one photoreceiver and two or more phototransmitters, where the respective phototransmitters are actuated to emit respective infrared light portions during respective successive time windows. The mobile device further includes a processor coupled to the photoreceiver and the phototransmitters, where the processor makes the determination of the temporal location of the external object based upon a plurality of signals provided at least indirectly to the processing device from the photoreceiver, where each signal is indicative of a reflected light portion received by the photoreceiver during a time window when an infrared light beam was emitted. Each phototransmitter is either oriented in a manner corresponding to an orientation of an outer surface with which the respective phototransmitter is associated, or directs light for reflection or refraction toward its respective outer surface.

Further, in at least one embodiment a method of determining a location of an external object relative to a mobile device includes (a) providing an infrared sensing assembly with a pyramid-type structure as part of the mobile device and (b) actuating two or more infrared phototransmitters within a plurality of sequential time windows, so that infrared light is directed away from the mobile device in several directions corresponding to various orientations of the outer surfaces of the infrared sensing assembly. The method also includes (c) receiving by way of at least one infrared photoreceiver a plurality of reflected light portions during the sequential time windows, where each one of the reflected light portions includes an amount of the infrared light that was directed outward away from the mobile device as a result of the actuating of a respective one of the infrared phototransmitters during its sequential time window. The method further includes (d) determining the location of the external object based upon signals from the at least one infrared photoreceiver indicative of the received reflected light portions.

FIG. 1 shows an exemplary mobile device 102 that includes, among its various components, an exemplary sensing assembly 104, in accordance with a first embodiment of the present invention. In the present example shown, the mobile device 102 is a smart phone, albeit the mobile device is also intended to be representative of a variety of other mobile devices that are encompassed within the scope of the present invention including, for example, cellular telephones, personal digital assistants (PDAs), other handheld or portable electronic devices such as notebook or laptop computing devices, headsets, MP3 players and other portable video and audio players, and navigation devices. Further included among the components of the mobile device 102 as shown in FIG. 1 are a video screen 106, a keypad 108 having numerous keys, and a navigation key cluster 110.

As will be described in further detail with respect to FIG. 3, the sensing assembly 104 in the present embodiment is a first embodiment of a pyramid-type sensing assembly that is capable of being used to detect the presence of an object (or a collection of objects) external to the mobile device 102 (and external to the sensing assembly itself). Depending upon the circumstance, the physical object (or objects) that is sensed can include a variety of inanimate objects and, in at least some circumstances, one or more portions of the body of a human being who is using the phone (or otherwise is in proximity to the phone) such as the human being's head or, as shown (partly in cutaway), a hand 111 of the human being. In the present embodiment, the sensing assembly 104 not only detects the presence of such an object in terms of whether such object is sufficiently proximate to the sensing assembly (and/or the mobile device), but also detects the object's three-dimensional location relative to the mobile device 102 in three-dimensional space.

In the present embodiment, the sensing assembly 104 operates in particular by transmitting one or more (typically multiple) infrared signals 113 out of the sensing assembly, the infrared signals 113 being generated by one or more infrared phototransmitters (e.g., photo-light emitting diodes (photo-LEDs)). More particularly, the phototransmitters can, but need not, be near-infrared photo-LEDs transmitting light having wavelength(s) in the range of approximately 850 to 890 nanometers. Portions of the infrared signal(s) 113 are then reflected by an object (or objects) that is present such as the hand 111, so as to constitute one or more reflected signals 115. The reflected signals 115 are in turn sensed by one or more infrared light sensing devices or photoreceivers (e.g., photodiodes), which more particularly can (but need not) be suited for receiving near-infrared light having wavelength(s) in the aforementioned range. As will be described in further detail below, by virtue of employing either multiple phototransmitters or multiple photoreceivers, the three-dimensional position of the hand 111 relative to the sensing assembly (and thus relative to the mobile device) can be accurately determined.

Figure 2:
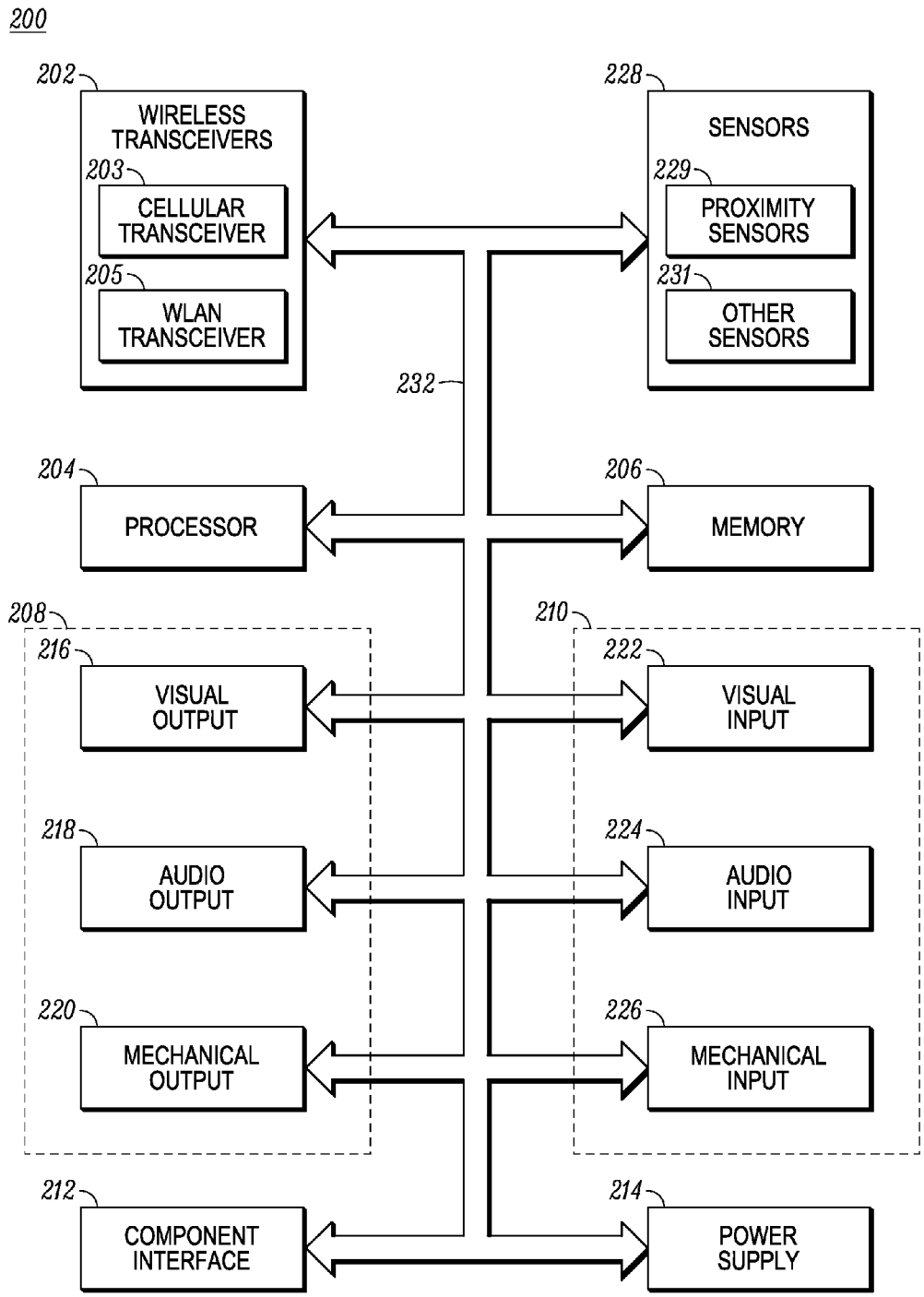
FIG. 2 is a block diagram illustrating exemplary components of the mobile device of FIG. 1.

Referring to FIG. 2, a block diagram illustrates exemplary internal components 200 of a mobile device such as the mobile device 102, in accordance with the present invention. The exemplary embodiment includes wireless transceivers 202, a processor 204 (e.g., a microprocessor, microcomputer, application-specific integrated circuit, etc.), a memory portion 206, one or more output devices 208, and one or more input devices 210. In at least some embodiments, a user interface is present that comprises one or more output devices 208 and one or more input device 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 102 to be portable. As will be described in further detail, the internal components 200 in the present embodiment further include sensors 228 such as the sensing assembly 104 of FIG. 1. All of the internal components 200 can be coupled to one another, and in communication with one another, by way of one or more internal communication links 232 (e.g., an internal bus).

Each of the wireless transceivers 202 utilizes a wireless technology for communication, such as, but not limited to, cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies such as infrared technology. In the present embodiment, the wireless transceivers 202 include both cellular transceivers 203 and a wireless local area network (WLAN) transceiver 205, although in other embodiments only one of these types of wireless transceivers (and possibly neither of these types of wireless transceivers, and/or other types of wireless transceivers) is present. Also, the number of wireless transceivers can vary and, in some embodiments, only one wireless transceiver is present and further, depending upon the embodiment, each wireless transceiver 202 can include both a receiver and a transmitter, or only one or the other of those devices.

Exemplary operation of the wireless transceivers 202 in conjunction with others of the internal components 200 of the mobile device 102 can take a variety of forms and can include, for example, operation in which, upon reception of wireless signals, the internal components detect communication signals and the transceiver 202 demodulates the communication signals to recover incoming information, such as voice and data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals to a remote device, such as a cell tower or a remote server (not shown).

Depending upon the embodiment, the input and output devices 208, 210 of the internal components 200 can include a variety of visual, audio, and mechanical outputs. For example, the output device(s) 208 can include a visual output device 216 such as a liquid crystal display and light emitting diode indicator, an audio output device 218 such as a speaker, alarm and/or buzzer, and/or a mechanical output device 220 such as a vibrating mechanism. The visual output devices 216 among other things can include the video screen 106 of FIG. 1. Likewise, by example, the input devices 210 can include a visual input device 222 such as an optical sensor (for example, a camera), an audio input device 224 such as a microphone, and a mechanical input device 226 such as a hall effect sensor, keyboard, keypad, selection button, touch pad, touchscreen, capacitive sensor, motion sensor, and/or switch. The mechanical input device 226 can in particular include, among other things, the keypad 108 and the navigation key cluster 110 of FIG. 1. Actions that can actuate one or more input devices 210 can include, but need not be limited to, opening the mobile device, unlocking the device, moving the device, and operating the device.

Although the sensors 228 of the internal components 200 can in at least some circumstances be considered as being encompassed within input devices 210, given the particular significance of one or more of these sensors 228 to the present embodiment the sensors instead are described independently of the input devices 210. In particular as shown, the sensors 228 can include both proximity sensors 229 and other sensors 231. As will be described in further detail, the proximity sensors 229 can include, among other things, one or more sensors such as the sensing assembly 104 of FIG. 1 by which the mobile device 102 is able to detect the presence of (e.g., the fact that the mobile device is in sufficient proximity to) and location of one or more external objects including portions of the body of a human being such as the hand 111 of FIG. 1. By comparison, the other sensors 231 can include other types of sensors, such as an accelerometer, touch sensors distributed around the mobile device, temperature sensors, acoustic sensors, force sensors, pressure sensors, atmospheric sensors, a gyroscope, or any other sensor that can help identify a current location or orientation of the mobile device 102, and the context of the device and device-user interface, for example, how the device is carried by the user or where it is resting.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include, but need not be limited to, operating systems, applications, and informational data. Each operating system includes executable code that controls basic functions of the communication device, such as interaction among the various internal components 200, communication with external devices via the wireless transceivers 202 and/or the component interface 212, and storage and retrieval of applications and data to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Figure 3:
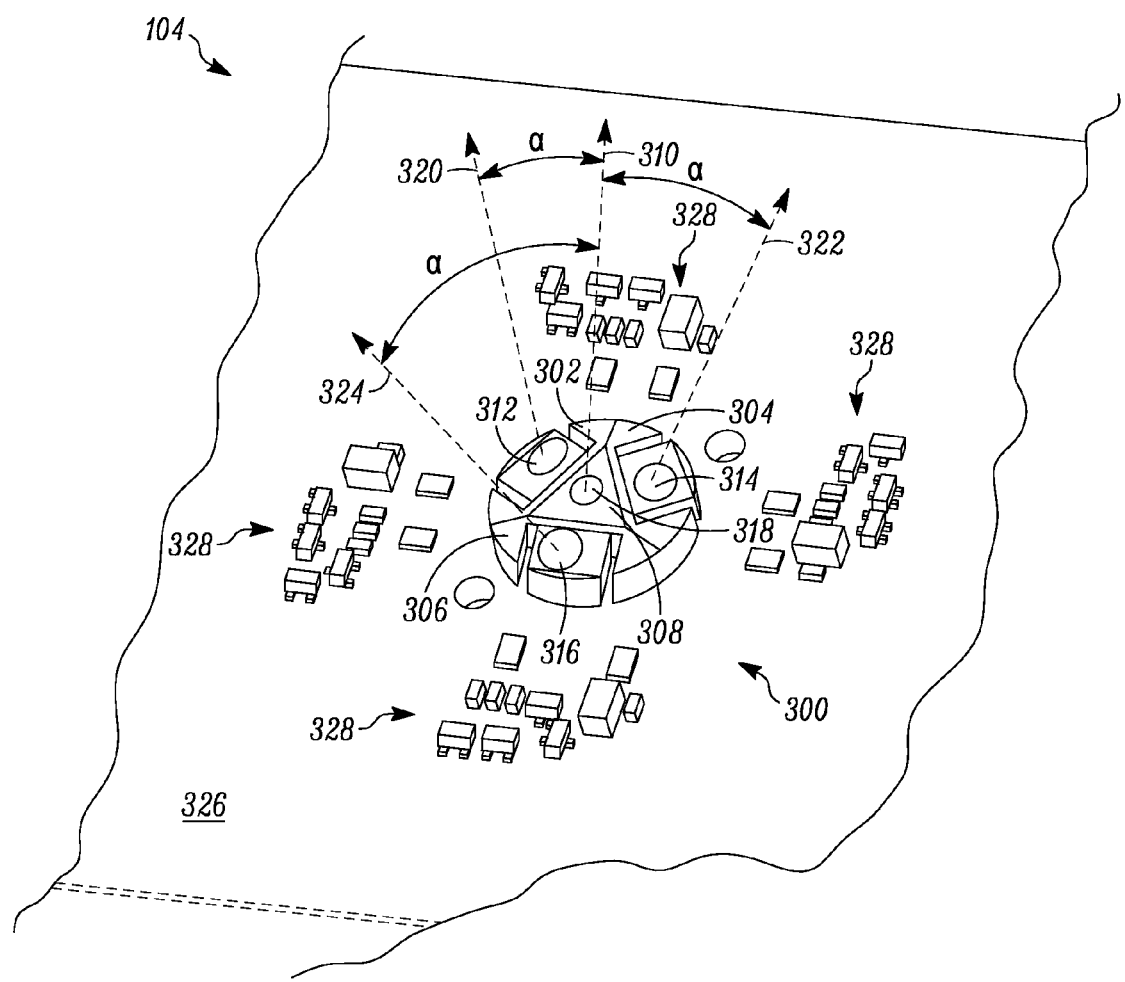
FIG. 3 is a front perspective view showing in more detail components of the pyramid-type sensing assembly of FIG. 1.

Turning to FIG. 3, components of the sensing assembly 104 of FIG. 1 are shown in more detail. As shown, the sensing assembly 104 in particular includes a pyramid-type housing structure 300 that more particularly can be considered a tetrahedral structure that is circular in cross-section and has first, second, and third inclined/tilted surfaces 302, 304, and 306, respectively, that extend downward from a triangular top surface 308. Embedded within the inclined surfaces 302, 304, and 306, are first, second and third phototransmitters 312, 314, and 316 respectively, which as noted above can be photo-LEDs suitable for emitting infrared light. The first, second and third phototransmitters 312, 314, and 316, are particularly oriented in a manner corresponding to their respective inclined surfaces 302, 304, and 306. That is, each of first, second and third center axes of transmission 320, 322, and 324, extending from the respective phototransmitters is perpendicular/normal to a respective one of the inclined surfaces 302, 304, and 306. Further, each of the center axes of transmission 320, 322, and 324 is generally offset by an angle α from a perpendicular axis 310 extending perpendicularly/normally from the top surface 308. The perpendicular axis 310 in the present embodiment is also perpendicular to the surface of the video screen 106 and generally to the overall front surface of the mobile device 102 upon which the sensing assembly 104, video screen 106, keypad 108 and navigation device 110 are all mounted. In at least some embodiments, manufacturing the phototransmitters in a tilted orientation, such as trapezoidal, provides an alternate position. As such, the phototransmitters are placed directly on a circuit board 326 as discrete devices instead of mounted on a pyramid like housing structure 300. In another embodiment, a microfilm lenses placed in the phototransmitters field of view can simulate tilting of the phototransmitters. In this case, the phototransmitters are placed flat on the circuit board 326 with the microfilm situated on top of the phototransmitters to optically bend the infrared beam.

Further as shown in FIG. 3, the pyramid-type sensing assembly 104 also includes an additional photoelectric device in addition to the phototransmitters 312, 314, and 316 (which themselves are photoelectric devices), namely, a photoreceiver 318 that is mounted along the top surface 308 and, in the present embodiment, is particularly arranged within the center of that surface (e.g., arranged at the center of the isosceles triangular surface). The photoreceiver 318, which as noted above can be a photodiode suitable for receiving infrared light, more particularly is arranged so that its center axis of reception is aligned with the perpendicular axis 310. Therefore, while the respective phototransmitters 312, 314, and 316 are oriented so as to emit light generally about the three center axes of transmission 320, 322, and 324, the photoreceiver 318 is orientated so as to receive light generally about the perpendicular axis 310. In short, the pyramid-type sensing assembly 104 can thus be described as including a single photoreceiver that is surrounded on its sides by three phototransmitters that equally-spaced apart from one another as one proceeds around the photoreceiver, and that are offset in terms of their vertical rotational orientations from the vertical rotational orientation of the photoreceiver by the same angular amount, where all of these components are housed within a tetrahedrally-shaped housing with surfaces that correspond to the rotational orientations of the phototransmitters and photoreceiver.

Due to the particular orientations of the phototransmitters 312, 314, 316 and the photoreceiver 318, light from the respective phototransmitters is directed generally in three different directions corresponding to the center axes of transmission 320, 322, 324 (although there may be some overlapping of the ranges within which the respective phototransmitters direct light), while the photoreceiver 318 due to its central location and orientation along the perpendicular axis 310 is potentially capable of receiving reflected light from a variety of directions that can overlap the directions of transmission of each of the three of the phototransmitters. More particularly, because the photoreceiver 318 is capable of receiving light from a wider range of angles about the perpendicular axis 310 than the ranges of angles about the respective center axes of transmission 320, 322, 324 within which the respective phototransmitters are capable of directing light, in the present embodiment the overall sensing assembly 104 operates predicated upon the assumption that the photoreceiver is capable of receiving light that is reflected off of an object such as the hand 111 even though the reflected light may have originated from any one or more of the three phototransmitters.

Further as illustrated in FIG. 3, the components of the sensing assembly 104 described above can be mounted directly upon the circuit board 326 upon which other components such as components 328 are mounted. By virtue of this direct mounting of the sensing assembly 104, the sensing assembly 104 need not protrude out far from the overall surface of the mobile device 102 on which the video screen 106, keypad 108 and navigation device 110 are all situated. In the embodiment of FIG. 3, the sensing assembly 104 is particularly shown to be implemented near a top edge of the front surface of the mobile device 102, which often is the location of a speaker of the mobile device. However, as discussed further below, other positions for such a sensing assembly are also possible.

Figure 4:
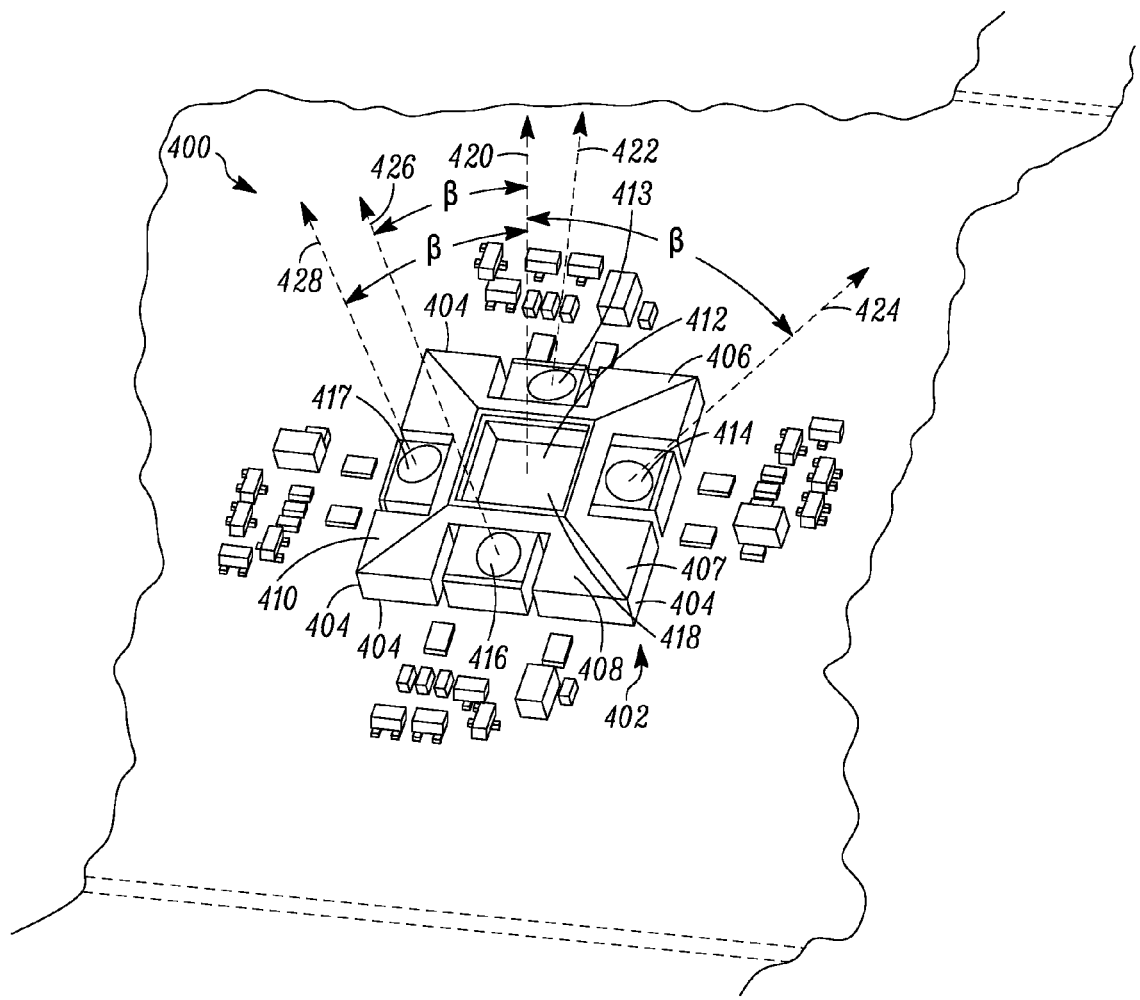
FIG. 4 is a front perspective view showing components of an alternate embodiment of the pyramid-type sensing assembly differing from that of FIGS. 1 and 3, in accordance with another embodiment of the present invention.

Turning next to FIG. 4, the present invention is intended to encompass numerous other pyramid-type sensing assemblies other than that shown in FIG. 3. For example, as shown in FIG. 4, a sensing assembly 400 is employed that has a more conventional four-sided pyramid-type shape (by comparison with the tetrahedral shape of FIG. 3 described above). More particularly, the sensing assembly 400 has a pyramid-type-housing structure 402 having four edges forming a square perimeter 404, and four inclined surfaces 406, 406, 408, and 410. Similar to the sensing assembly 104 of FIG. 3, the housing structure 402 of the sensing assembly 400 additionally includes a top surface 412 from which each of the four inclined surfaces 406, 407, 408, and 410 slope downwardly. As with respect to the sensing assembly 104, a respective phototransmitter (again, for example, a photo-LED) 413, 414, 416, and 417 exists along each of the inclined surfaces 406, 407, 408, and 410, and a photoreceiver (again, for example, a photodiode) 418 is on the top surface 412. Thus, similar to the sensing assembly 104, the sensing assembly 400 includes multiple phototransmitters arranged about (and equally spaced about) a single photoreceiver that is centrally positioned in between the phototransmitters. In at least some embodiments the phototransmitters are tilted by mounting (nesting) the phototransmitters in a wall detail (recessed portion).

Further as shown in FIG. 4, a center axis of reception of the photoreceiver 418 again is aligned with a perpendicular axis 420 normally extending from the top surface 412, which is angularly spaced apart by an angle $\beta$ from each first, second, third, and fourth center axes of transmission 422, 424, 426, and 428 of the respective phototransmitters 413, 414, 416, and 417. Thus, as with the sensing assembly 104, the respective phototransmitters 413, 414, 416, 417 each are vertically rotationally offset relative to the perpendicular axis 420 (and thus relative to the center axis of reception of the photoreceiver 418) in a manner corresponding to the slopes of the respective inclined surfaces 406, 407, 408, 410 with which the phototransmitters are associated. Also as with the sensing assembly 104, the photoreceiver 418 is capable of receiving light within a much wider range of angles relative to the perpendicular axis 420 than the respective phototransmitters 413, 414, 416, 417 transmit light relative to their respective center axes of transmission 422, 424, 426, 428, and operation of the sensing assembly 400 again is predicated upon the assumption that the photoreceiver 418 is capable of receiving light that is reflected off of an external object that may have been transmitted by any one or more of the phototransmitters 413, 414, 416, 417.

Figure 5:
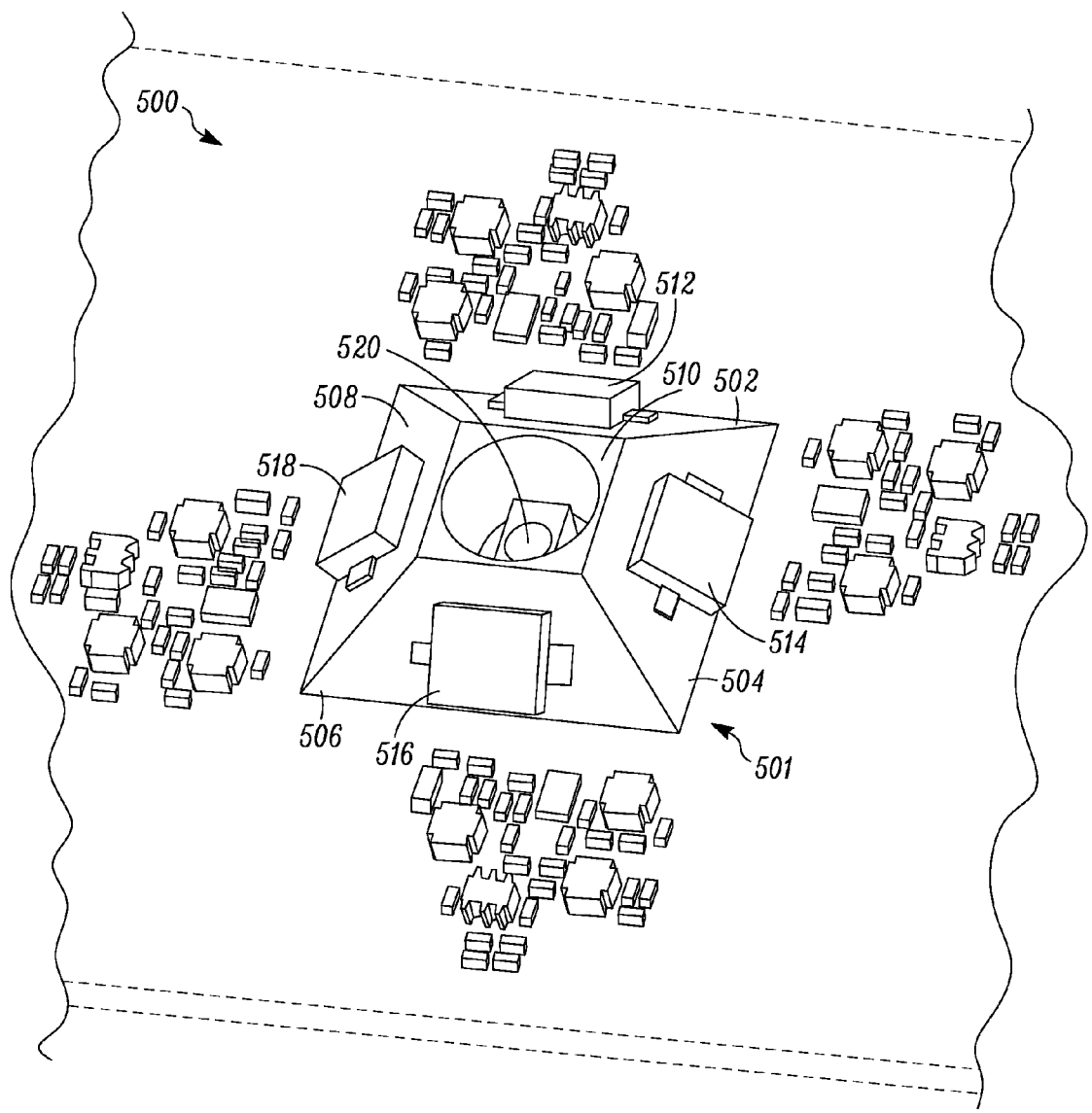
FIG. 5 is a front perspective view showing components of an additional alternate embodiment of the pyramid-type sensing assembly differing from those of FIGS. 1, 3, and 4, in accordance with still another embodiment of the present invention.

Referring next to FIG. 5, a further alternate embodiment shows a sensing assembly 500. In this embodiment, the sensing assembly 500 again has a pyramid-type housing structure 501 with four inclined surfaces 502, 504, 506, and 520, each of which is inclined and slopes downwardly from a horizontal top surface 510. In this embodiment, however, the sensing assembly 500 does not employ phototransmitters on the inclined surfaces 502, 504, 506, and 520, but rather has mounted on those surfaces first, second, third and fourth photoreceivers 512, 514, 516, and 518, respectively. Further, instead of employing a photoreceiver along the top surface 510, instead a phototransmitter 520 is mounted along (or, more particularly, recessed within) that surface. Given this, design, in contrast to the embodiments of FIGS. 3 and 4, it is expected that light emitted from the phototransmitter 520, upon being reflected by an object or objects external to the mobile device (e.g., the hand 111), will be reflected to one or more of the photoreceivers 512, 514, 516, and 518.

Although not shown in FIGS. 3-5, in some circumstances the photoreceivers 318, 418, and 512, 514, 516, 518 need not extend up to the very outer surfaces of the sensing assemblies/pyramid-type housing structures, but rather there can be positioned above those photoreceivers additional structures such as transparent windows or walls that provide protection for the photoreceivers and/or provide additional desired optical properties. In some such circumstances, for example, such transparent windows can constitute waveguides (or "V-notches" or Compound Parabolic Concentrator (CPC) waveguides) that serve to better direct incoming reflected light into the photoreceivers, and that serve as lenses for magnification purposes, improving gain and minimizing local coupling. In some cases, certain portions of the surfaces surrounding the photoreceivers can be coated with silver or copper paint (or other shiny material) so as to reflect infrared light toward the photoreceivers. Also, in some cases, the photoreceivers themselves can be shielded (e.g., electrically shielded). In at least some embodiments, the electrical shield can serve the purpose of an optical waveguide to help direct incoming light into the photoreceiver and the opaque surface to block internal/direct infrared receptions from the adjacent phototransmitters in the absence of an external object. Further, the photoreceivers can be "optically filtered diodes" to alleviate background lighting issues or optically clear where background filtering is achieved via the covering lens (visible light filtering dark lens embedded in the housing and placed above the infrared system. The housing lens covering the infrared diodes can be flat or curved to improve infrared gain and coverage. These types of features can be of particular interest in relation to the embodiments such as those of FIGS. 3 and 4 involving a single photoreceiver.

Further, depending upon the embodiment, the photoreceivers can take a variety of forms including, for example, angle-diversity receivers or fly-eye receivers. Depending upon the embodiment, various filters can be employed above the photoreceivers and/or phototransmitters to filter out undesired light. Different filters can in some circumstances be employed with different ones of the phototransmitters/photoreceivers, for example, to allow for different colors of light to be associated with, transmitted by, or received by, the different components.

Each of the embodiments of sensing assemblies shown in FIGS. 3-5 are similar (notwithstanding their differences) in that multiple phototransmitters and/or photoreceivers are co-located (that is, commonly located) in a single or shared small region, that is, a region that is small by comparison with the overall surface dimensions of the mobile device on which the sensing assemblies are intended to be implemented. Further, in at least these embodiments, it is additionally the case that either only one photoreceiver (where multiple phototransmitters are present) or only one phototransmitter (where multiple photoreceivers are present) is used, although the present invention is also intended to encompass other embodiments in which there are multiple phototransmitters as well as multiple photoreceivers that are co-located. Also, as already mentioned with respect to FIG. 3, in each of these embodiments, the phototransmitter(s)/photoreceiver(s) and associated pyramid-type housing structures can be (but need not be) mounted on a circuit board along with other circuit components.

The co-location of the phototransmitter(s)/photoreceiver(s) mounted in the pyramid-type housing structures in accordance with embodiments such as those of FIGS. 3-5 is beneficial in several regards. First, by virtue of the co-location of photoreceiving and phototransmitting devices in the manners shown, including the particular orientations shown (e.g., relative to the perpendicular axes 310, 420), it is possible for the respective sensing assembly to facilitate the sensing not only of the presence of an external object (that is, to detect the fact that the object is within a given distance or proximity relative to the sensing assembly) but also the location of an external object such as the hand 111 in three-dimensional space relative to the sensing assembly. The potential for achieving this exists even though in each of the embodiments of FIGS. 3-5, there is only one of either a phototransmitter or a photoreceiver, as discussed in further detail with reference to FIG. 6 below. Further, by virtue of the co-location of the photoreceiving and phototransmitting devices in the manners shown, in the pyramid-type housing structures, the resulting sensing assemblies are both robust and concentrated (rather than distributed) in design. Thus, the sensing assemblies can potentially be discrete structures that with implementation relative to many different types of existing mobile devices, by way of a relatively simple installation process, as add-on or even after-market devices.

The particular angular ranges associated with the transmission or reception of light by the different phototransmitters and photoreceivers associated with sensing assemblies such as those described above can vary with the embodiment and depending upon the intended purpose. As noted earlier, typically photoreceivers can have a range of reception (e.g., a 60 degree range) that is larger than the range of transmission of the phototransmitters (e.g., a 30 degree range). Nevertheless, this need not be the case in all embodiments. That said, it should further be noted that it is anticipated that, in practical implementations, the embodiments of FIGS. 3 and 4 may be superior to that of FIG. 5 insofar as it is commonly the case that the angular range over which a given photoreceiver is capable of receiving light is considerably larger than the angular range over which a phototransmitter is capable of sending light. Also, the use of a single photoreceiver to receive the reflected light arise from multiple phototransmitters as is the case with the embodiments of FIGS. 3 and 4 typically allows for greater consistency of sensing than a reverse implementation such as that of FIG. 5. In the case of multiple infrared phototransmitters and a single infrared photoreceiver, the single infrared photoreceiver can be formed by multiple infrared photoreceivers electrically connected in parallel to simulate a single infrared photoreceiver formed by an array of adjacent flat photoreceivers or even adjacent tilted photoreceivers pointing in different directions.

Figure 6:
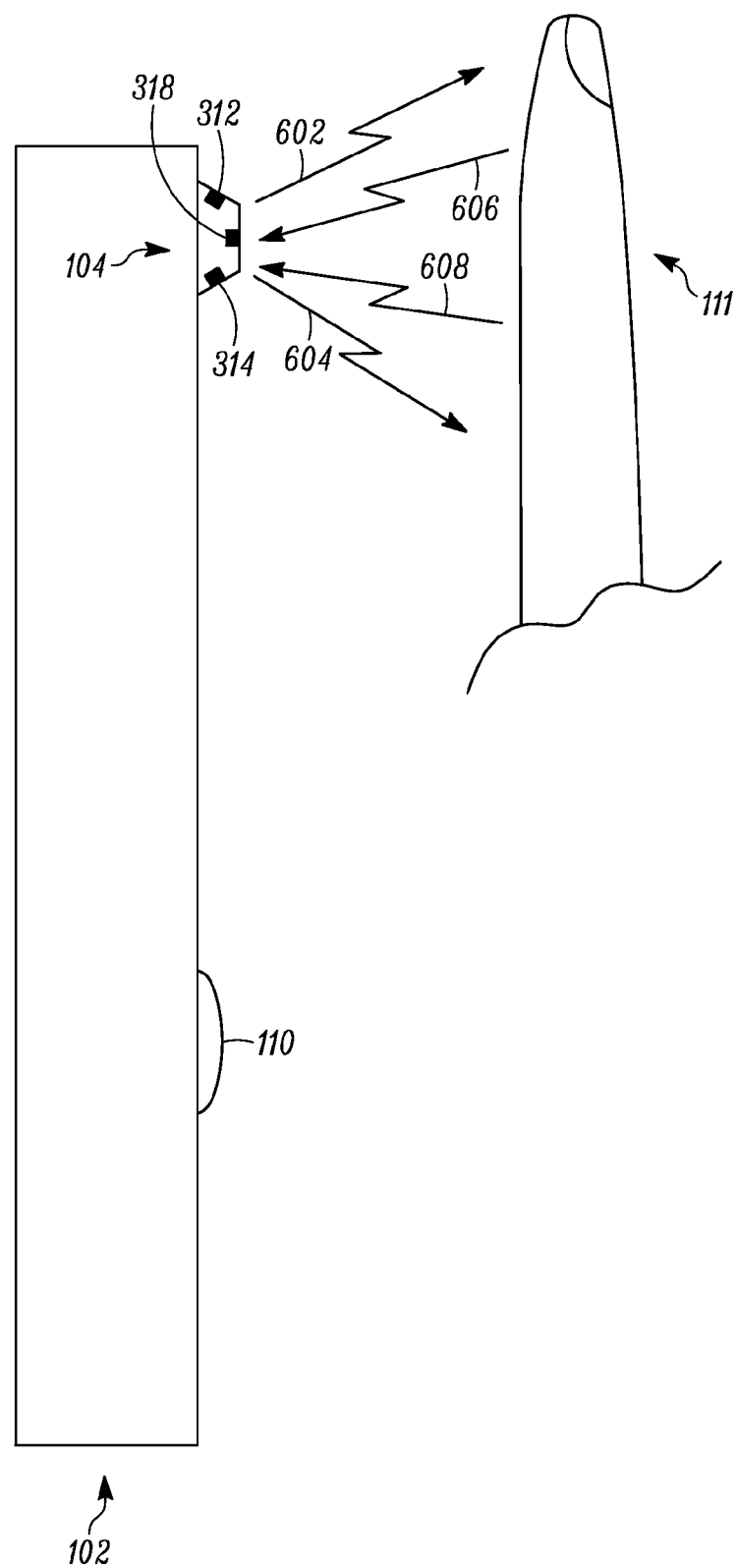
FIG. 6 is a side elevation view of the mobile device, sensing assembly, and external object (again shown partially in cut-away) of FIG. 1, illustrating further the manner in which location of the external object is sensed.

Turning to FIG. 6, a side-view of the mobile device 102 and hand 111 of FIG. 1 is provided (with the hand again shown partly in cutaway) to further illustrate how the sensing assembly 104 with its co-located phototransmitters and single photoreceiver is capable of detecting the presence and location of the hand (or a portion thereof, e.g., a finger). As illustrated, when the hand 111 is present and positioned sufficiently proximate the sensing assembly 104, it is often if not typically (or always) the case that the hand will be positioned at a location that is within the range of transmission of light of at least two if not all three of the phototransmitters 312, 314, and 316 of the sensing assembly. In the present example, therefore, when light transmits from more than one of the phototransmitters, for example, the phototransmitters 312 and 314 as shown, emit light 602 and 604 from the respective phototransmitters reaching the hand at an angle and reflecting off the hand so as to generate corresponding amounts of reflected light 606 and 608, respectively. Given the position of the photoreceiver 318 in between the phototransmitters 312, 314, these amounts of reflected light 606, 608 both reach the photoreceiver in different time slots and are sensed by the photoreceiver as shown. An alternate embodiment includes using different optical or electrical modulation schemes for each phototransmitter as to permit the phototransmitters to transmit at the same time instead of at separate times. In addition, different color LEDs can be used to enable wavelength division multiplexing implementations.

Figure 7:
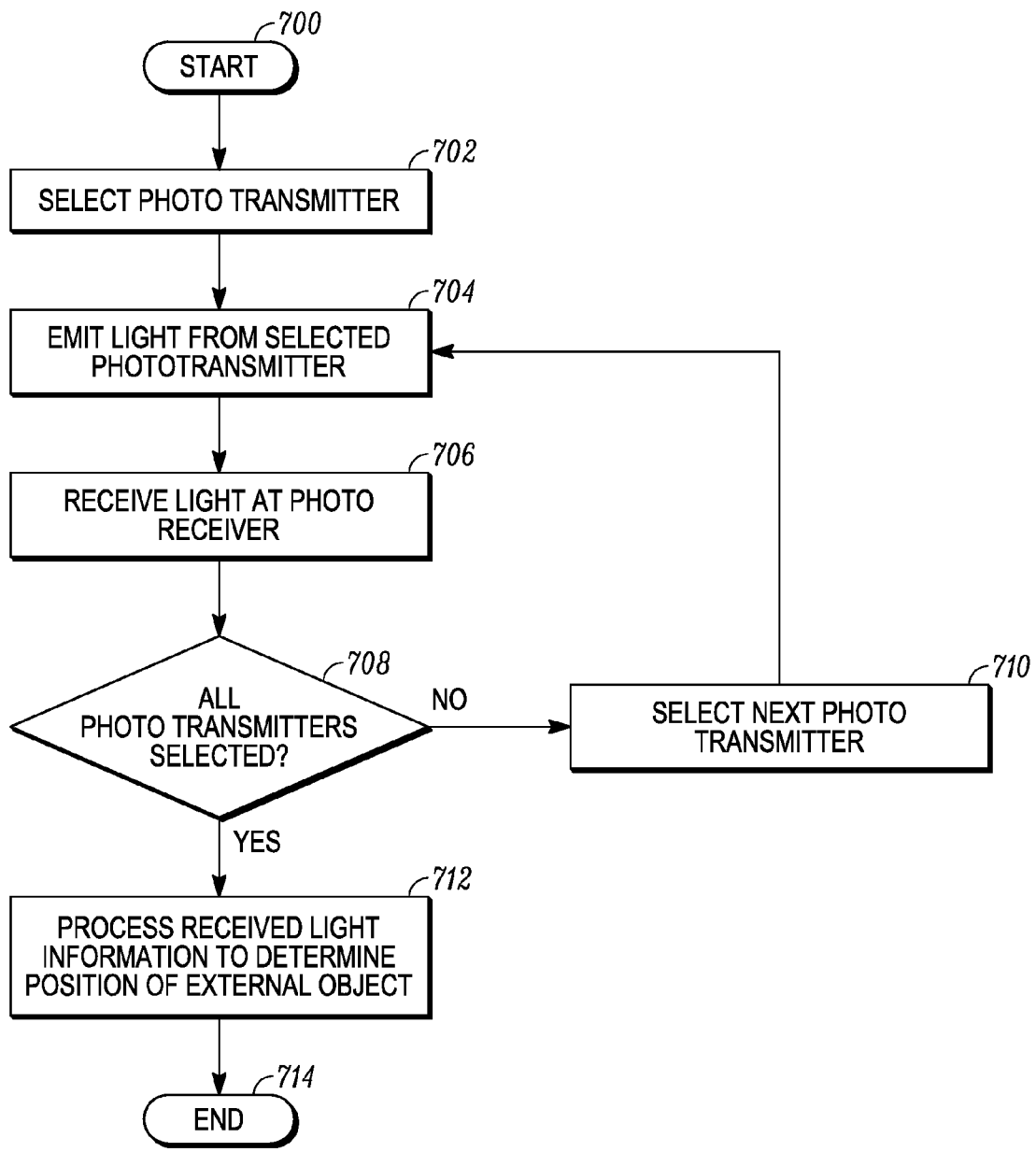
FIG. 7 is a flow chart illustrating exemplary steps of operation of the sensing assembly (and a processing device operating in conjunction therewith), in accordance with at least some embodiments of the present invention.

Referring additionally to FIG. 7, a flow chart shows in more detail one exemplary manner of operating the components of the sensing assembly 104 to determine the location of an external object (e.g., the hand 111). As shown, after starting operation at step 700, a first of the phototransmitters of the sensing assembly 104 (e.g., the phototransmitter 312) is selected at step 702. Then at step 704, the selected phototransmitter actuates and emits infrared light from that phototransmitter. That light can then proceed towards the external object (e.g., as the emitted light 602 of FIG. 6) and, upon reaching the external object, some of that light is reflected by the external object (e.g., as the reflected light 606). At step 706 the photoreceiver (e.g., the photoreceiver 318) receives that reflected light and the photoreceiver correspondingly sends a signal to a processing device (and in some cases, a memory device) that records the received information. At step 708 it is further determined whether all of the phototransmitters have been actuated. If this is not the case, then another of the remaining phototransmitters (e.g., the phototransmitter 314) is selected at step 710 and then steps 704, 706, 708 are repeated (e.g., such that the emitted light 604 is transmitted and the reflected light 608 is received by the photoreceiver). If however at step 708 it is determined that all of the phototransmitters have been actuated and, consequently, reflected light signals have been received by the photoreceiver in relation to the light emitted by each of those phototransmitters, then at step 712 the information from the photoreceiver is processed to determine the location of the external object.

The processed signal information from the photoreceiver can determine the location of the external object as follows. The manner of operation described in FIG. 7 effectively constitutes a form of time division multiplexing in which the various phototransmitters are turned on and off one at a time in a serial manner, such that there are successive time windows associated with the actuation of the different phototransmitters. Given that the external object being sensed is positioned relatively close to the transmitters and photoreceiver, these successive time windows not only constitute the respective windows within which the different phototransmitters are actuated but also constitute the respective windows within which light originating at the respective phototransmitters is emitted, reflected off of an external object, and received at the photoreceiver. Thus, the signals provided from the photoreceiver that are indicative of the intensity/amount of light received by the photoreceiver during any given time window can be compared relative to the intensity/amount of light given off by the phototransmitter known to have emitted light during that time window, and such comparisons can serve as a measurement of the proportion of light emitted by a given phototransmitter that actually returns to the photoreceiver due to reflection by the external object. Such measurements in turn serve as indications of the proximity/location of the external object to the respective phototransmitters and photoreceiver between which the light is communicated.

In some embodiments, additional information is taken into account and/or one or more assumptions are made to provide greater measurement accuracy. For example, such measurements particularly become more accurate as an indication of proximity if one can make an accurate assumption regarding the physical reflectivity of the external object, something which is typically possible to a sufficiently high degree in practice. Additionally, the physical positions/orientations of the phototransmitters and photoreceivers also influence the measurements and should be taken into account. Further, angular variations in the transmission and reception of the phototransmitters and photoreceiver also should be taken into account. In this respect, and as already discussed, each of the phototransmitters has a respective center axis of transmission and the photoreceiver similarly has a respective center axis of reception. The transmission intensity from the phototransmitters changes (typically decreases) as the angle between that center axis of transmission and the actual direction of transmission increases, and likewise the reception ability of the photoreceiver also changes (typically decreases) as the angle between the center axis of reception and the actual direction of reception increases. Typically, the degrees to which these quantities vary as one moves away from the center axes of transmission or reception are known properties associated with the phototransmitters and photoreceivers.

Assuming then that a processing device has all of these types of information or at least can rely upon reasonable assumptions concerning these issues, the processing device receiving the signals from the photoreceiver (e.g., the processor 204 of FIG. 2, which also can control the actuation of the phototransmitters) is not only able to determine the distance of the external object from the infrared sensing assembly, but more particularly is also able to determine the three-dimensional location of the external object by a type of triangulation calculation (or calculations). More particularly, after the processing device has associated the multiple amplitude (intensity) levels indicated by the photoreceiver as occurring during the different time windows within which multiple phototransmitters have respectively been actuated to transmit light, the processing device can not only determine the amount/intensity of infrared light emanating from each phototransmitter that is reflected back to the photoreceiver but also can compare the relative amounts/intensities of infrared light originating at the different phototransmitters that are reflected back to the photoreceiver, so as to determine the location of the external object relative to the infrared sensing assembly. Generally speaking, as the amounts/intensities of infrared light reflected back to the photoreceiver tend to differ from one another based upon the phototransmitter from which the infrared light originated, this tends to indicate that the external object has shifted to one or another of the sides of the infrared sensing assembly.

For example, if an external object is directly in front of the sensing assembly 104 as shown in FIG. 6, then the intensity of light received by the photoreceiver 318 should be approximately the same regardless of which of the phototransmitters (e.g., which of the phototransmitters 312, 314 as shown, and also the phototransmitter 316) is actuated. Correspondingly, if the signals received from the photoreceiver 318 are the same or nearly the same during each of three successive time windows during which the three phototransmitters are successively actuated, then processing of this information should determine that the external object is in front of the sensing assembly 104. In contrast, if the received light signal provided by the photoreceiver 318 during the time windows corresponding to the actuation of the phototransmitter 312 is much higher than the received light signal provided by the photoreceiver during the time windows corresponding to the actuation of the phototransmitters 314 and 316, then processing of this information should determine that the external object is to the side of the sensing assembly 104, closer to the phototransmitter 312 than to either of the other two phototransmitters.

Although the above description of how to determine the location of an external object by way of triangulation particularly envisions the use of information concerning light received at a single photoreceiver originating at multiple phototransmitters (e.g., as is the case in the embodiments of infrared sensing assemblies shown in FIGS. 3 and 4), a similar process is equally applicable where multiple photoreceivers are used to receive multiple different components of reflected light that originated at a single phototransmitter (e.g., as is the case in the embodiment shown in FIG. 5). In all of these embodiments, to the extent that multiple reflected light samples are obtained during a succession of time windows, it is typically assumed that the time windows are sufficiently short that it is unlikely that the external object will have moved significantly during the overall span of time encompassing all of the time windows of interest. Also, while it can be the case that sampling during a single set of time windows (e.g., where only one set of photoemissions as occurred, with each phototransmitter being actuated only once) is adequate to determine the location of an external object, it is also possible that multiple repetitive reflected light samples will be obtained and utilized to determine the location of an external object (e.g., where the processing device not only takes into account multiple samplings of received light occurring as each of the phototransmitters is successively actuated during successive time windows, but also takes into account further samplings of received light as the phototransmitters are successively actuated additional times).

Finally, notwithstanding the general description above of how reflected light information is utilized to determine an external object's location, it will be understood that other additional or different processing steps can also be employed to determine or more closely estimate object location. For example, in some circumstances, it is desirable for background light determinations to be made prior to the making of measurements of reflected light intensity (e.g., before or in between the successive time windows as discussed above), so that background noise can be evaluated and taken into account by the processing device in its calculations, and so that the processing device can adjust operational parameters of the phototransmitters, and/or photoreceivers such as gain, etc. In this regard, for example, one can consider the disclosures found in U.S. patent application Ser. No. 12/344,760 filed Dec. 29, 2008 and entitled "Portable Electronic Device Having Self-Calibrating Proximity Sensors" and U.S. patent application Ser. No. 12/347,146 filed Dec. 31, 2008 and entitled "Portable Electronic Device Having Directional Proximity Sensors Based on Device Orientation", each of which is hereby incorporated by reference herein, and each of which is assigned to the same beneficial assignee as the present application.

It should be further noted that, in at least some embodiments, operation of the sensing assembly is limited so as to consider reflected light only originating from certain subset(s) of the available phototransmitters. In some such embodiments where the sensing assembly is implemented in a cellular telephone or PDA, a hand tracking/gesturing offset to a side above the mobile device is enabled by eliminating from the infrared tracking any signals originating from phototransmitters on the side of the sensing assembly that is blocked as a result of the position offset. For example, with respect to the embodiment of FIG. 4, reflected light originating from one of the phototransmitters on a blocked side of the sensing assembly would not be considered in determining the presence/location of an external object (or possibly that phototransmitter would not be actuated to emit light). This manner of operation is workable because, if a human user places a hand above a touchscreen and offset to the right so that the hand does not block a viewing of the touchscreen, reflection from the left side LED of the sensing assembly is almost nonexistent (point away and opposite to hand location) and the other three LEDs are used for hand tracking and vice-versa (as a result, it is possible to track a hand by positioning a hand to the side).

Although the term "triangulation" is used for the specific algorithm described above, the three dimensional location of an external object can use alternative algorithms such as other types triangulation, trilateralization, intensity ratios, and signal differences. Determining these locations over time allows tracking of the object.

Figure 8:
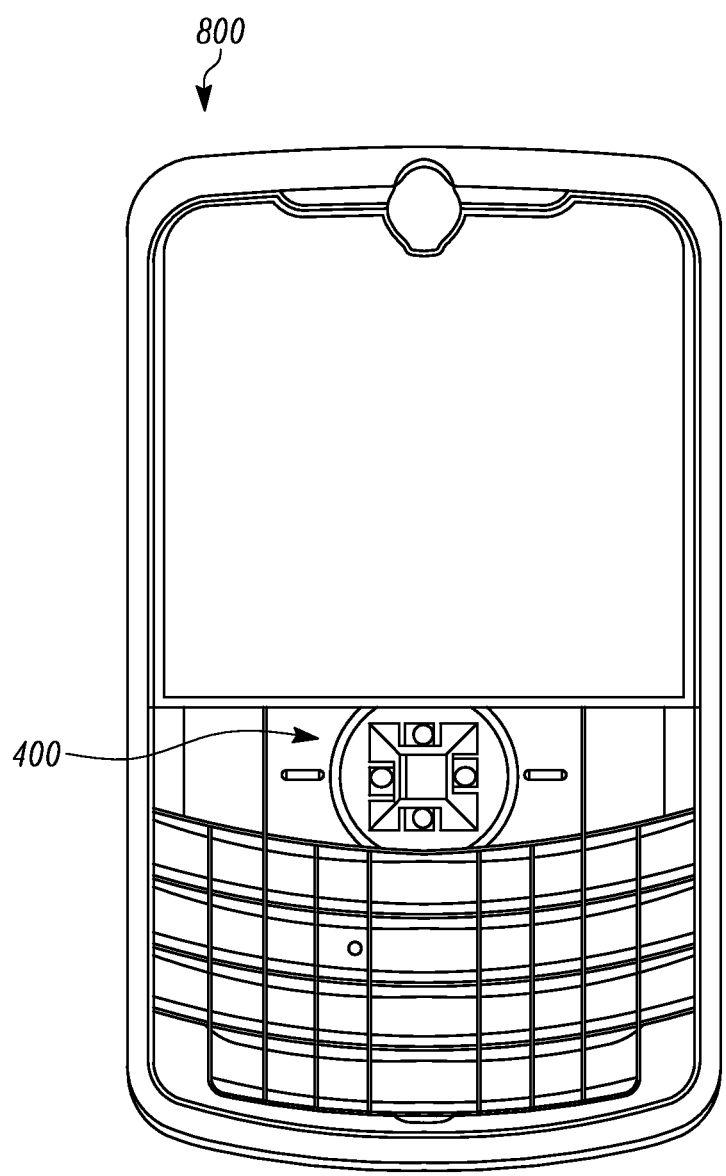
FIGS. 8 and 9 are front elevation views of two additional exemplary mobile devices that can employ the pyramid-type sensing assembly of FIG. 3, 4, or 5.
Figure 9:
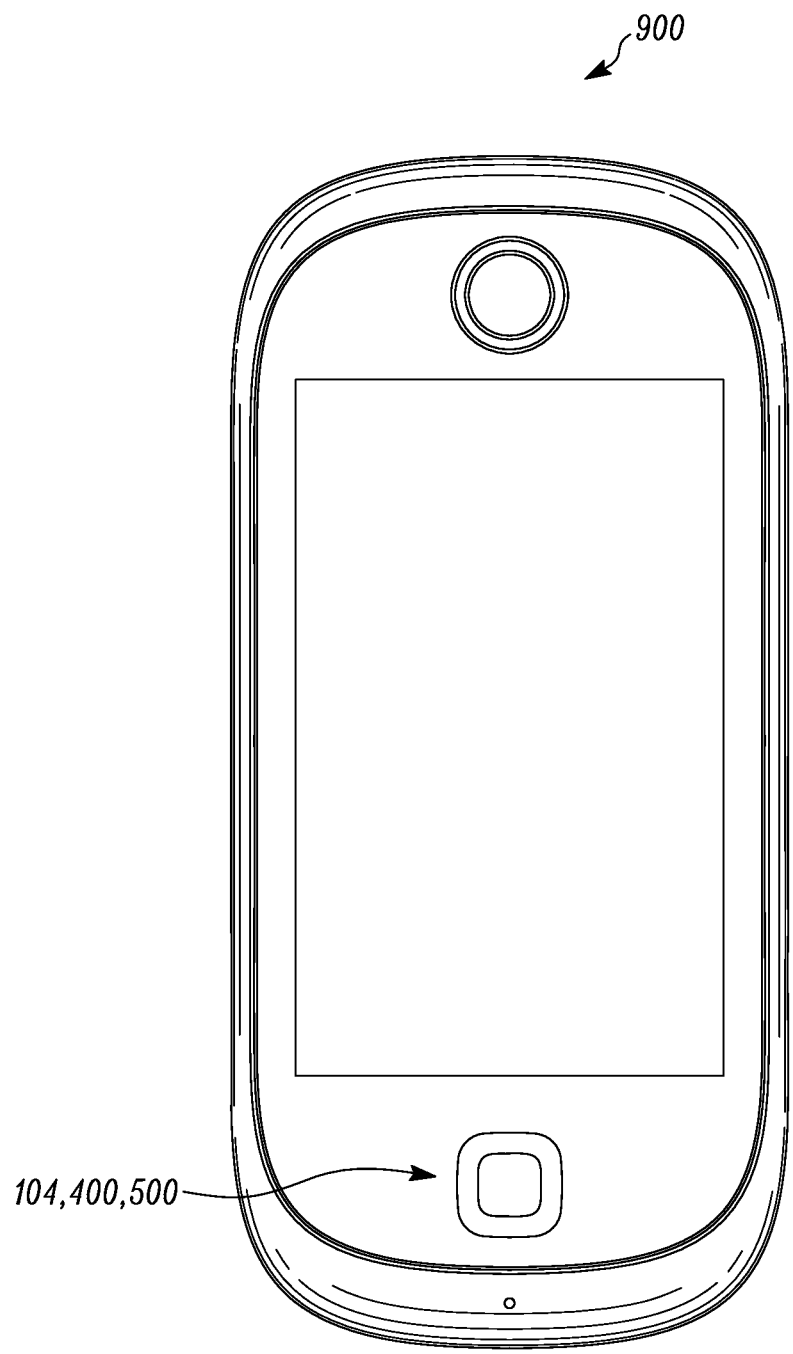

Turning to FIGS. 8 and 9, the positioning of a sensing assembly such as the sensing assemblies 104, 400, and 500 of FIGS. 3-6 can vary depending upon the embodiment and the mobile device. As shown in FIG. 8, for example, a sensing device such as the sensing assembly 400 can be positioned at a location in the middle of the front surface of a mobile device such as a mobile device 800. In some such embodiments, the sensing assembly 400 can replace the navigation key cluster, such that the pyramid-type housing structure of the sensing assembly serves not only to house the phototransmitter(s)/photoreceiver(s) but also serves as a button/actuator that can be pressed and/or tilted/rotated relative to the front surface of the mobile device, thereby allowing for hands-free and/or touch-based control.

Also, notwithstanding the embodiment of FIGS. 1 and 6, a sensing assembly can be implemented at either end or along any edge of any given mobile device depending upon the embodiment. For example, as shown in FIG. 9, a sensing assembly 104, 400, 500 such as that of the FIGS. 3-5 can be implemented at the opposite end of a mobile device (e.g., near the bottom of the front surface) 900 rather than at the end shown in FIGS. 1 and 6 (e.g., near the top of the front surface). The mobile device 900 also is intended to illustrate how a sensing assembly such as any of those described above can be implemented on a mobile device in which the entire front surface is a glass or plastic/transparent video screen or touchscreen. It should be noted that blocking problems of the type discussed above (e.g., involving hand positioning) typically do not occur when the sensing assembly is at the bottom of a touchscreen as shown in FIG. 9, albeit in such embodiments it can be desirable to tilt the sensing assembly slightly toward a point nearer to the center of the phone (or to use a lens to achieve such effect).

Although the above-described embodiments all envision the implementation of one or more photoreceivers and phototransmitters along (or recessed within) different walls of a pyramid-type structure, where the respective orientations of those photoreceiver(s)/phototransmitter(s) correspond to the orientations of the respective surfaces of the pyramid-type structure in which those devices are implemented, the present invention should also be understood as encompassing numerous additional embodiments differing from those described above in certain aspects. For example, in at least some embodiments, the photoreceiver(s)/phototransmitter(s), while being held together in a manner by which the various devices maintain relative angular positions that are the same as (or similar to) those described above, nevertheless are not housed within any particular pyramid-type housing structure with specific walls as described above. Indeed, the present invention can encompass embodiments in which there are merely several photoreceiver(s)/phototransmitter(s) that are assembled/collocated to one another but have no walls or structures positioned in between those devices. This is referred to as the distributed scheme where photoreceiver(s)/phototransmitter(s) differentiate object location based on their X/Y separation from each other, rather than a respective tilt angle.

Also, the above-described embodiments envision particularly the implementation of multiple (e.g., three or more) devices of one type (e.g., phototransmitters or photoreceivers) surrounding a single device of another type (e.g., a photoreceiver or phototransmitter), where the devices of the one type are equally-spaced apart from one another around the device of the other type, where the devices of the one type are all equally spaced apart from the device of the other type, and where the devices of the one type are angularly offset in their orientation relative to the orientation of the device of the other type by a consistent angular amount (e.g., by the angle $\alpha$ or $\beta$), other embodiments are also possible. For example, in some alternate embodiments, the devices of the one type need not all be equally spaced apart from one another about the device of the other type, need not all be equidistant from the device of the other type, and/or need not all be offset in their orientation relative to that of the other device by the same amount.

Figure 10:
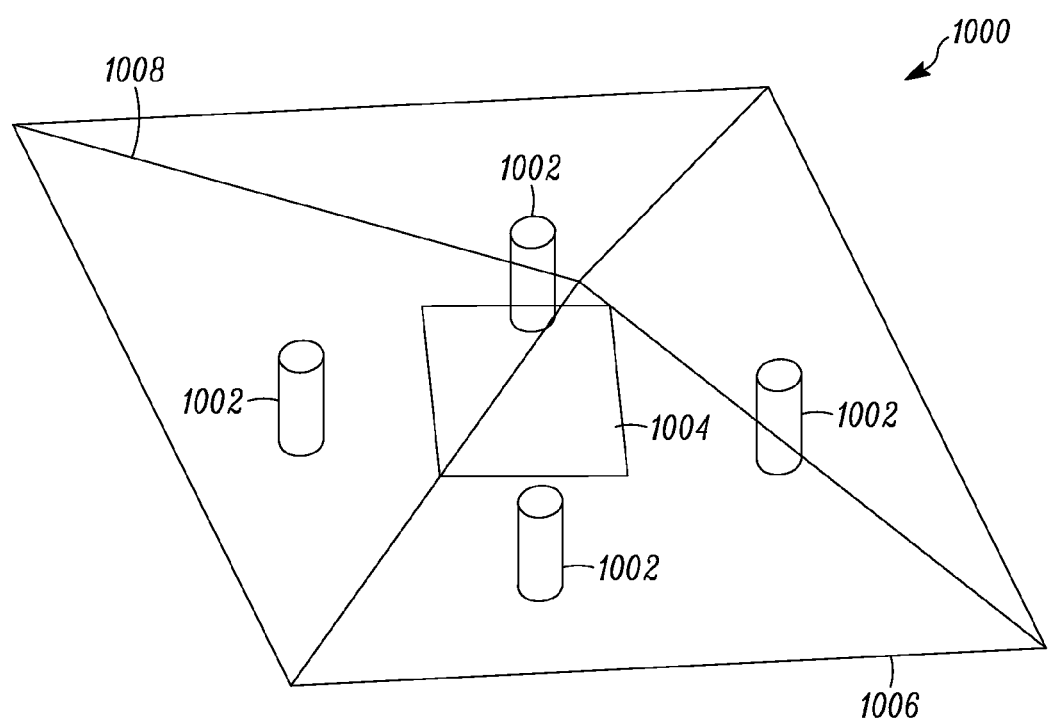
FIG. 10 shows a further alternate embodiment of the sensing assembly that differs from that of FIG. 4 in that, instead of being a pyramid-type sensing assembly, the sensing assembly employs a lens that results in the sensing assembly experiencing operational behavior similar to that experienced by the pyramid-type sensing assembly of FIG. 4.

In this regard, one exemplary alternate embodiment of a sensing assembly 1000 is shown in FIG. 10. As shown, in this embodiment, the sensing assembly 1000 like the sensing assembly 400 of FIG. 4 has four phototransmitters 1002 spaced around a single photoreceiver 1004. However, in contrast to the sensing assembly 400, the phototransmitters 1002 each are vertically oriented so as to have center axes of transmission that are parallel to the center axis of reception of the photoreceiver 1004. That is, the phototransmitters 1002 are not at all offset in their rotational orientation relative to the photoreceiver. Further, a housing 1006 within which the phototransmitters 1002 and photoreceiver 1004 are supported does not necessarily have a pyramidal shape with any inclined surfaces.

Notwithstanding these differences between the sensing assembly 1000 and the sensing assembly 400, the sensing assembly 1000 nonetheless is able to transmit light and receive reflected light (as reflected by an external object) as if the phototransmitters were rotationally offset relative to the photoreceiver insofar as the sensing assembly 1000 additionally includes a pyramid-shaped lens or prism 1008 (or possibly multiple lenses in a pyramid-type shape) provided atop the phototransmitters and photoreceiver (or possibly only over one or more of those devices) that refracts/bends the transmitted light exiting the sensing assembly/lens and/or refracts/bends the received light incident upon the sensing assembly/lens, such that the overall transmission and reception of light out of and into the sensing assembly proceeds in substantially the same manner as is experienced by the sensing assembly 400. In some circumstances, the lens 1008 can be microfilm for beam bending, particularly if the involved angles are small (e.g., 10 to 5 degrees) and the photo-LEDs have relatively narrow transmission ranges (e.g., plus or minus 30 degrees). Although the lens 1008 is shown to be of a pyramid-type form that includes four inclined sides sloping away from a tip of the lens (in this case, this tip can be considered a central surface of the lens), in other embodiments, the lens can take a form that is more similar to that of the pyramid-type structures described above in relation to FIGS. 3-5, in which the tip portion of the pyramid is missing such that there exists a central surface that is more extensive (e.g., such as the top surfaces 308, 412, and 510) away from which the inclined surfaces slope.

Figure 11:
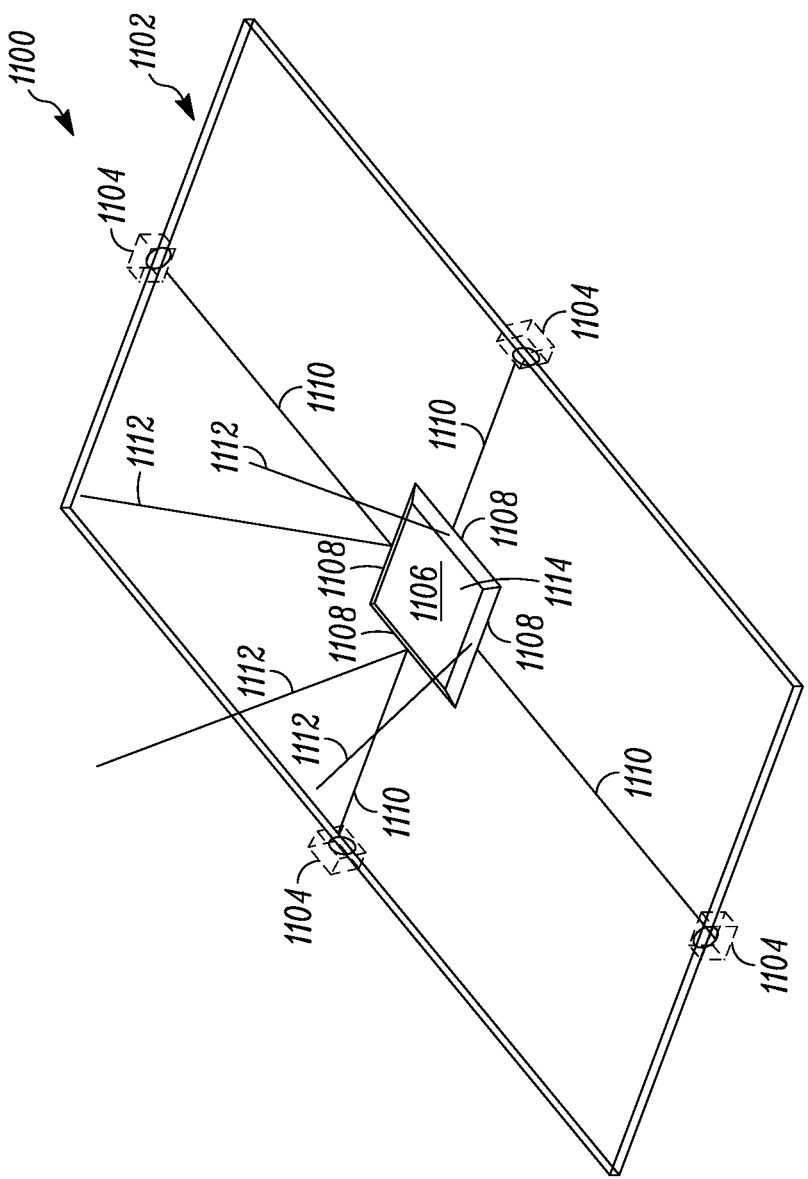
FIG. 11 shows an additional alternate embodiment of sensing assembly differing from those of FIGS. 1-6 and 8-10, which includes a prism/mirror structure that receives light from a plurality of different respective phototransmitters positioned at respective locations apart from one another and apart from the location of the prism/mirror structure.

The present invention further is intended to encompass additional embodiments of sensing assemblies that are particularly useful for implementation in certain types of mobile devices. Referring particularly to FIG. 11, a further sensing assembly 1100 is shown to be implemented in relation to a glass (or transparent plastic) video screen or touchscreen 1102 as is common in certain types of mobile devices, including for example the mobile device 900 of FIG. 9. As shown, in the embodiment of FIG. 11, the sensing assembly 1100 includes four transceivers 1104, each of which includes a respective phototransmitter and a respective photoreceiver, and the respective transceivers are respectively positioned at the midpoints of each of the four side edges of the screen 1102. Further as shown, the sensing assembly 1100 also includes a pyramid-type formation 1106 that is formed as part of (or positioned just beneath) the screen 1102. The pyramid-type formation 1106 includes four inclined surfaces 1108 extending from the four sides of a square top (horizontal) surface 1114, where each of the inclined surfaces slopes downwardly from the top surface towards one of the respective edges of the screen 1102. The surface 1108 could be coated with reflective material, (e.g. a reflective deposit, metal, paint, etc).

The sensing assembly 1100 of FIG. 11 operates as follows. In a first manner of operation, light is transmitted from each of the phototransmitters of the respective transceivers 1104 via respective optical waveguides 1110 through the screen 1102 (or just beneath the screen, parallel to its surface) toward the respective one of the inclined surfaces 1108 closest to that respective transceiver. Upon reaching the inclined surfaces, the light is reflected outward from the sensing assembly 1100 (and thus from the mobile device on which it is implemented) at various angles depending upon the slopes of the inclined surfaces 1108, with the light transmission being centered about respective center axes of transmission 1112. Thus, transmitted light emanates from the sensing assembly 1100 in much the same manner as if the light had been emitted directly from phototransmitters arranged along the sides of a pyramid-type structure as shown in FIG. 4. After the light is emitted about the center axes of transmission 1112, it can then be reflected off an external object such as the hand 111 of FIG. 1. Portions of the reflected light eventually are received by one or more of the photoreceivers associated with the respective transceivers 1104, and thereby the reflected light is sensed.

Further variations of the sensing assembly 1100 are also possible. For example, in one alternate embodiment, rather than reflecting light to be transmitted out of the sensing assembly, the inclined surfaces 1108 of the pyramid-type formation 1106 instead are intended to reflect incoming reflected light back toward the transceivers 1104, at which are located respective photoreceivers. In such embodiments, the phototransmitters of the transceivers 1104 can be configured to transmit light directly outward (e.g., perpendicular to the surface of the screen 1102) at the locations of the transceivers, with that light in turn being partly or entirely reflected by an external object back toward the pyramid-type formation 1106. In further alternate embodiments, rather than employing four transceivers that each have a respective phototransmitter and a respective photoreceiver, only four phototransmitters or four photoreceivers are provided at the locations of the transceivers 1104 shown in FIG. 11. In such embodiments, where four phototransmitters are positioned at the edges of the screen 1102, a photoreceiver can be positioned along the top surface of the pyramid-type formation and, where four photoreceivers are positioned at the edges of the screen, a phototransmitter can be positioned along the top surface of the pyramid-type formation.

Each of the embodiments described above in relation to FIG. 11 are particularly advantageous insofar as they facilitate the use of a pyramid-type formation such as the pyramid-type formation 1106 having a height that is considerably less than the heights of the pyramid-type formations of the sensing assemblies 104, 400, 500 previously described. Thus, there is no need (or much less need) to have a housing structure protruding outward from the surface of the mobile device. Further the pyramid-type formation 1106 can be transparent and thus substantially the same in appearance as the remainder of the screen 1102. Thus, the use of such pyramid-type formations such as the formation 1106 can be particularly advantageous for use in mobile devices where it is desired that the front surface of the device be a large flat video screen or touchscreen, uninterrupted by bumps or regions where the video screen or touchscreen is unable to display information.

It should be noted with respect to the sensing assembly embodiments of FIGS. 10 and 11 that, even though the structures employed are different to some extent than those shown in FIGS. 1-6, each of these embodiments nevertheless can be operated in essentially the same manner as is described with reference to FIG. 7. Further, although the lens 1008 of FIG. 10 and the pyramid-type formation 1106 of FIG. 11 are four-sided pyramid-type structures, in other embodiments other pyramid-type structures (e.g., tetrahedral structures) can also be employed.

Notwithstanding the above discussion, the present invention is intended to encompass numerous other embodiments as well. For example, in some other embodiments, there are only two phototransmitters (and one or more photoreceivers) or only two photoreceivers (and one or more phototransmitters). In other embodiments, there are more than four phototransmitters (and one or more photoreceivers), or more than four photoreceivers (and one or more phototransmitters). Also, while in many embodiments of the present invention the sensing assembly is intended to be mounted to a mobile device in a fixed/stationary manner, which can be advantageous because such manner of mounting can be easily achieved without the need for many complicated components, in some other embodiments it is possible that the sensing assembly is mounted to a mobile device in a tiltable, rotational, or translatable manner to facilitate tilting, rotation and/or translation of the sensing assembly relative to the remainder of the mobile device (typically, such tilting, rotation and translation would be limited in nature, e.g., as discussed above in the example where the sensing assembly replaces the navigation key cluster). Additionally, while in some embodiments discussed above such as those of FIGS. 3 and 4 the photoreceiver (photodiode) is placed inside the pyramid-type structure (e.g., at the center of the structure), in alternate embodiments the photoreceiver (photodiode) can be positioned on top of or outside of the pyramid-type structure or its center.

Further, although the embodiments discussed above envision a single infrared sensing assembly being implemented on a given mobile device, it is also possible in some other embodiments that multiple infrared sensing assemblies will be implemented on a given mobile device. For example, in some embodiments of mobile devices, two sensing assemblies positioned on diametrically opposed outer surfaces of the mobile device can be employed so as to facilitate the detection of the presence and location of external objects on both sides of the mobile device. Additionally, although the particular tetrahedron and four-sided pyramid structures are described above, it should be understood that other embodiments employing similar structures having multiple inclined surfaces and the like are also encompassed within the present invention. Further, while the use of a lens/pyramid structure for the purpose of bending/refracting light is discussed above with respect to certain embodiments, the bending/refracting of light can also be achieved by having an optical diode placed in a tilted package, or having a tilted lens attached to it (indeed, in some circumstances an infrared photo-LED or photodiode for use as a phototransmitter or photoreceiver will be manufactured by a vendor with such tilted characteristics, which can for example be referred to as "top shoot", "side shoot", or "tilted shoot", among other things).

Also, while in the embodiments discussed above it is envisioned that the sensing assembly will be implemented in conjunction with a mobile device or other device, where the mobile device or other device will include the processor, and in some cases, other components appropriate for controlling actuation of the phototransmitter(s) of the sensing assembly, for receiving signals indicative of the receiving of reflected light by the photoreceiver(s), and for determining the presence and location of external object(s) based upon those received signals, in other embodiments it is possible that the sensing assembly will itself include processor(s), and in some cases, other components as are appropriate (e.g., memory device(s), battery/power source device(s), and input/output terminal(s), etc.) for allowing the sensing assembly to operate by itself in terms of controlling the actuation of its phototransmitter(s), monitoring the operation of its photoreceiver(s), making presence/location determinations, and communicating such presence/location information to other, external devices. In some such embodiments, the sensing assembly itself has one or more terminals/ports/interfaces suitable for allowing the sensing assembly to communicate with remote devices via wired or wireless networks including by way of internet-type networks.

Embodiments of the present invention allow for a mobile device, with an appropriate sensing assembly, to achieve beneficial manners of operation based upon the information obtained regarding the presence and location of external object(s). For example, in some mobile devices such as cellular telephones, the presence and location of a human user's phone is of interest and can be used to govern or influence one or more operations of the telephones. To begin, the use of a sensing assembly such as those described above can allow a cellular telephone to detect whether a human user's hand or ear are proximate a right side of a phone or a left side of a phone, and thereby facilitate adjustments to phone operation. Further, for example, the volume of a phone speaker can be automatically adjusted based upon the sensed position of a human user's head. Sensing assemblies such as those described above also can enable tracking movement without blockage when placing/tracking a hand above the phone offset to the left or right side of the phone.

Also for example, through the use of a sensing assembly such as one or more of those discussed above, it is possible to enable a mobile device to sense and recognize hand gestures that signify user selections or commands. Further for example in this regard, sensed movement of a finger of a human user above the front surface of a mobile device can signify a command by the human user that an image or content displayed on the mobile device be paused/frozen (e.g., to facilitate sending or sharing of the image/content), changed, free/selected (e.g., that a page of information be turned so that a different page of information is displayed), shared, etc., or that a cursor displayed on a screen be moved (e.g., a command such as that often provided by a "mouse"), or that a zoom level or pan setting regarding an image (e.g., a map or photograph) be modified. In this manner, such infrared gesturing can serve as a substitute for a touchscreen, where a user need not actually touch the surface of the mobile device to execute a command (albeit the system can still be implemented in a manner that also allows for commands to be recognized when touching does occur). By eliminating the need to touch a screen, disadvantages potentially associated with touching (e.g., fingerprints and other smudging of a video display screen or germ transmission) can be reduced. Alternate technologies, such as ultrasonic sensing or some types of camera sensing, can also be implemented to track hand movements (or the movements of other types of external objects) in three-dimensional space.

In some circumstances, different hand movements or repeated hand movements sensed by way of the sensing assembly of a mobile device can be understood as constituting a first command that a particular variable operational characteristic be selected (e.g., that a volume control icon appear on the video screen of the mobile device) followed by a second command modifying a setting of the variable operational characteristic (e.g., that the volume be set to a particular level). Particularly in this regard, for example, because infrared sensing assemblies of the type described above are capable of detecting both movements across the assemblies (e.g., horizontal-plane movements) as well as movements toward or away from the assemblies (e.g., vertical-plane movements), a horizontal xy-plane gesture can be followed by a vertical z-axis gesture as an indication of particular commands. Further, for example, using such gestures, the horizontal gesture could precipitate a volume (or zoom) adjustor icon to become available while the vertical gesture could in fact cause adjustment in the volume (or zoom) to a desired level. Alternatively, where multiple repeated hand movements are anticipated, the failure of a second or successive hand movement to occur can be interpreted as a command that some other action be taken (e.g., that a cursor or image be recentered or otherwise repositioned).

One example of operation encompassing a number of the above-described considerations would be as follows. Suppose a user placed a hand approximately six inches above a touchscreen and to the right side of a cellular telephone on which an infrared sensing assembly was provided. Immediately, in this instance, the phone might respond by placing a cursor on the right side edge of the touchscreen corresponding to the hand location. However, assuming that the user hand was kept stationary in that location for one second, then the phone might further act to re-center/map the cursors to the middle of the touchscreen (corresponding to the hand being near the right side of the phone). As discussed above, given placement of the hand on the right side of the phone, the phone might operate to track the hand by operating the sensing assembly so that only certain portions of reflected light (e.g., as generated by certain ones of the phototransmitters, for example, three out of four of the phototransmitters of the sensing assembly of FIG. 4, but not the phototransmitter pointing toward the left side of the phone) were considered. Once the user completed an operation of interest (e.g., panning or zooming), the user's hand might remain stationary again and this could signify that the current image should be paused/frozen.

In some embodiments, the operation of existing other sensors of a mobile device (e.g., an accelerometer capable of detecting a physical tapping of a navigation device) can be coordinated with the operation of an infrared sensing assembly such as those described above. For example, depending upon the embodiment, a variety of other sensors in addition to an infrared sensing assembly can be utilized in detecting commands in a navigation mode of operation and/or to adjust an infrared range accordingly in switching between an infrared sensing mode of operation and a touch-based mode of operation. Further for example, in some embodiments in which the sensing assembly is implemented as a navigation device, navigation can be achieved by a hand gesture above the sensing assembly (not touching the sensing assembly), followed by pressing of the center of the navigation device to achieve selection. In such a case, infrared reception would go from a maximum level (where the finger was near the sensing assembly) to a minimum level (where the finger blocks reception entirely), and such a maximum to minimum occurrence would be interpreted as constituting a selection input. Alternatively, for example, a tap as sensed by another sensor could then precipitate the mobile device's anticipating an imminent user command that would be sensed via the infrared sensing assembly. Also, in some circumstances, sliding of an external object such as a finger directly along the sensing assembly (involving touching) can be recognized as a command.

Mobile devices implementing sensing assemblies such as those described above can be utilized in other contexts as well. For example, a mobile device implementing a sensing assembly such as those described above can be operated so as to recognize the proximity of a surface (e.g., a desktop) to the mobile device, such that the mobile device when positioned and moved over the surface can be utilized as a mouse. Relatedly, by sensing the positioning/tilting of a human user's hand relative to an infrared sensing assembly on a mobile device, mouse-type commands can also be provided to the mobile device. In such applications, it can be particularly desirable to utilize phototransmitters having narrow angular ranges of transmission to facilitate high sensitivity in detecting the tilting of a user's hand.

Also, in some embodiments, operation of the sensing assembly itself can be controlled based upon sensed information concerning the location of external object(s). For example, in some cases, the sampling rate (e.g., in terms of the frequency with which the various phototransmitters of a sensing assembly such as the sensing assembly 104 are actuated to emit light) can be modified based upon the proximity of the user, so as to adjust the sensitivity of the location detection based upon the proximity of the user. Indeed, while the manner of operation described with respect to FIG. 7 envisions that the different phototransmitters of a given sensing assembly will be actuated in succession rather than simultaneously, in some cases it may be desirable to actuate all of the phototransmitters simultaneously to increase the overall intensity of the light emitted by the sensing assembly, which can increase the overall amount of reflected light that makes its way back to the photoreceiver and thereby make it possible to sense the proximity of an external object even though the object is a fairly large distance away from the sensing assembly. For example, the range of proximity detection of a sensing assembly can be increased from six inches where the phototransmitters are successively actuated to two feet where all of the phototransmitters are actuated simultaneously (this can be referred to as "super-range proximity detection").

Figure 12:
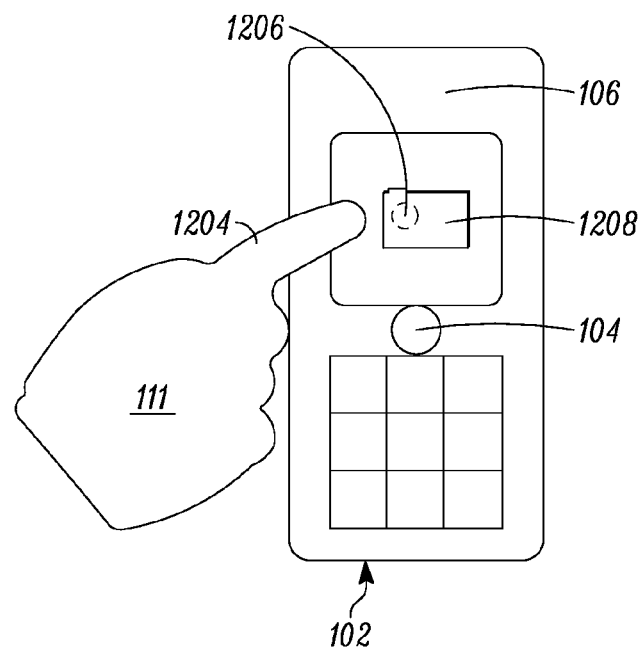
FIG. 12 is a front elevation view of one embodiment of exemplary first and second mobile devices that are in communication with one another.
Figure 12:
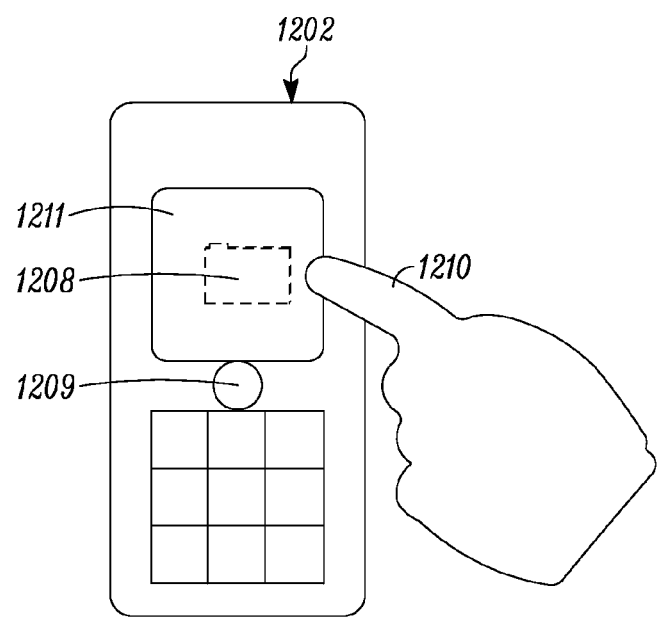

In at least some further embodiments, one or more sensing assemblies such as any of those discussed above can be employed on multiple electronic devices as shown in FIGS. 12-16 to allow users to control/influence communications between such devices. More particularly, in at least some such embodiments, a user is able to cause information associated with a file stored on a mobile device to be transmitted to another electronic device (or possibly to more than one other electronic device). Depending upon the embodiment, the other electronic device can be (but need not be) a mobile device. For example, the other electronic device can be a non-mobile device such as a desktop computer rather than a mobile device such as a laptop computer. Referring in this regard to FIG. 12, the sensing assembly 104 of the mobile device 102 (also shown in FIG. 1) is an example of how to facilitate data transmission between that mobile device and another mobile device 1202. As described in further detail below, a user can, by moving a finger 1204 of the hand 111 of the user (or another object) toward the mobile device 102, select an image portion 1208 displayed on the screen 106 of the mobile device 102. After selection has been achieved, the user can offer for transmission the underlying data associated with the selected image portion 1208, by motioning the finger 1204 toward the other mobile device 1202 within a preset time window. The sensing of the motion triggers the mobile device 102 to transmit a signal indicating that data is being offered for transfer.

Further as illustrated in FIG. 12, the other mobile device 1202 accepts the offer when the other mobile device detects the presence of a finger 1210 or other external object. As a result of acceptance by the other mobile device 1202, the second mobile device 1202 sends a signal to the first mobile device 102 requesting the data. In at least some embodiments, the receiving device does not require an infrared system sensor assembly 1209. In such a situation, the user can tap the device, activate a sensor, or push a button, etc., to receive the file. Upon the mobile device 102 receiving the acceptance indication from the other device 1202, the mobile device 102 transmits the data corresponding to the selected image portion 1208 to the other device 1202, as represented by the showing of the selected image portion 1208 on a screen 1211 of the mobile device 1202 in phantom. In some embodiments, the other device 1202 subsequently transmits a further acceptance signal to the mobile device 102 confirming its receipt of the data.

Figure 13:
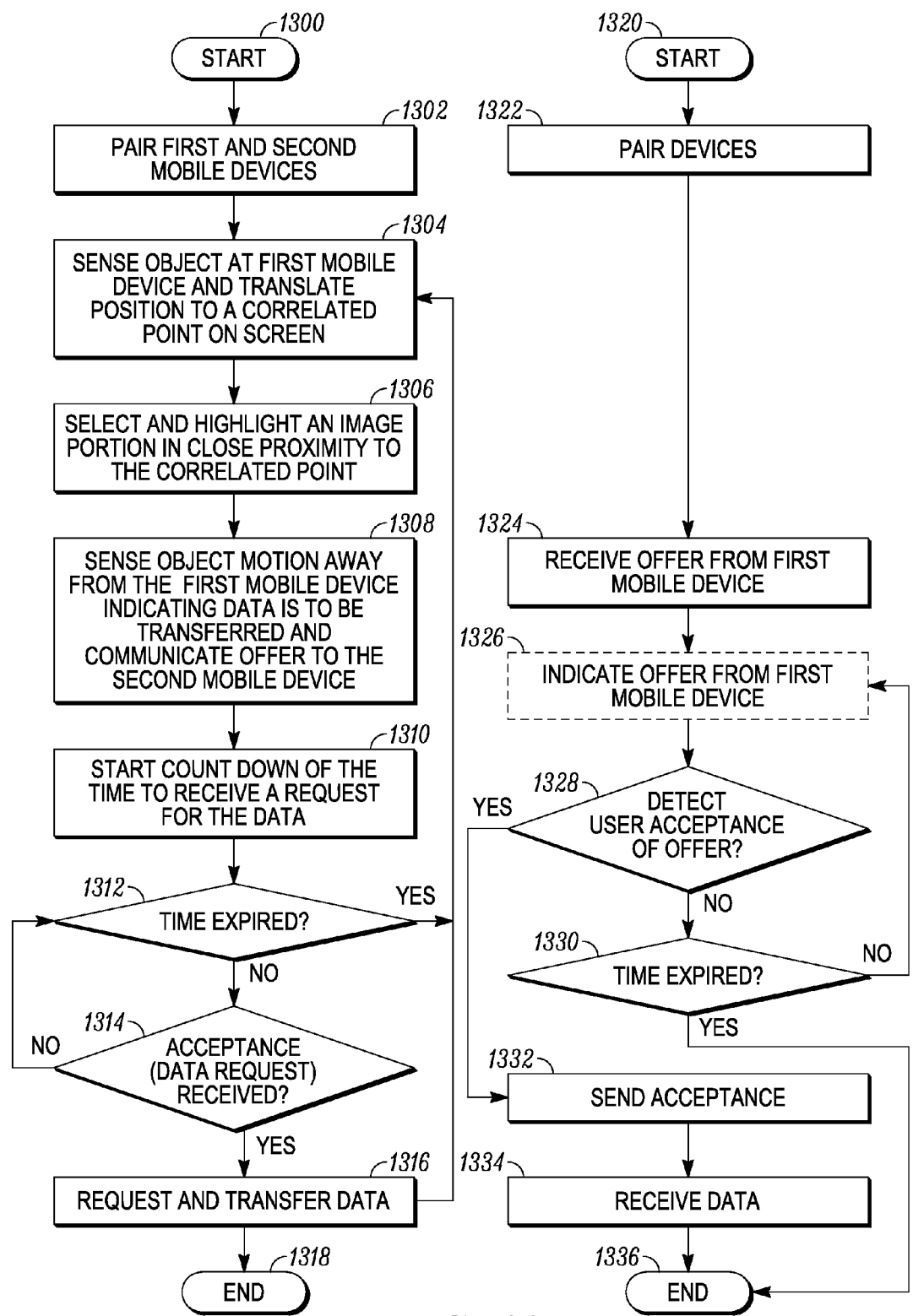
FIG. 13 is a flow chart illustrating exemplary steps pertaining to the operation of selecting and transmitting data between two mobile devices such as those of FIG. 12, in accordance with at least some embodiments.

Referring additionally to FIG. 13, exemplary steps of operation of the mobile devices 102, 1202 performed in accomplishing the data transfer discussed above with respect to FIG. 12 are shown in more detail, in accordance with at least some embodiments. As discussed further below, exemplary steps of operation of the first mobile device 102 include steps 1300-1318 while exemplary steps of operation of the second mobile device 1202 reflecting its interaction with the first mobile device include steps 1320-1336. As shown, upon starting operation at step 1300, at step 1302 the first mobile device 102 is paired with a second mobile device 1202 using one or more wireless communication paths, for example, Bluetooth, Wi-Fi, or infrared communications. This pairing can be proximity type pairing where, as soon as two or more mobile devices are placed near each other, they are paired. Simultaneously, from the perspective of the second mobile device 1202, a corresponding step 1322 at which the second mobile device 1202 is paired with the first mobile device 102 occurs after the second mobile device begins its operations at step 1320. Although the pairing action is described as occurring particularly at steps 1302, 1322, depending upon the embodiment, such pairing can occur at different times (e.g., before the process of FIG. 12 begins in earnest), or after one or more other steps of the process of FIG. 13. In addition, the pairing can be accomplished automatically or manually (e.g., in response to an express user command).

With respect to the operation of the first mobile device 102, subsequent to step 1302, that mobile device at step 1304 next senses an object with the sensing assembly 104, such as the finger 1204 of the hand 111 shown in FIG. 12, positioned near the sensing assembly and in front of the video screen 106. Upon sensing the finger 1204, the sensing assembly 104 determines the position of the finger 1204 and tracks its movement (e.g., by way of triangulation of infrared reflections as previously described). More particularly, the mobile device 102, using the processor 204 (FIG. 2), determines a location of the finger 1204 and, based upon that location, determines a correlated point 1206 on the video screen 106 (or a section/portion of the video screen) indicated by the finger. Alternatively, the mobile device 102 determines a correlated point (or video screen section/portion) that is overlapped by or otherwise matched by the finger 1204. The correlated point 1206, upon being determined by the mobile device 102, can be displayed on the screen 106 as a marker, such as a cursor, or it may not be identified at all. Then at step 1306, the first mobile device 102 further determines whether the correlated point 1206 is positioned on or otherwise associated with any image portion currently being displayed at that point on the video screen 106.

Depending upon the embodiment, an image portion can take a variety of active or inactive forms. Inactive forms can include for example, an icon, an item in a displayed list (e.g., a list of files), and a symbol (including, for example, a word or hyperlink). Active forms can include for example, a currently running program/application box, a currently displayed picture, video, music performance, etc. The image portion can include any representation that can be selected or otherwise chosen. In at least some embodiments, the image portion is indicative of a file or other dataset that is stored at (or otherwise available from) the mobile device 102, or is indicative of a program or application that can be run on (or is otherwise available from or can be initiated via) the mobile device 102. Thus, for example, the image portion 1208 of FIG. 12 is shown to be a file-folder that represents and is linked to one or more data files stored on or made accessible by way of the mobile device 102. In other examples, the image portion can be representative of image files, song files, contact information, notes, and a variety of other types of data or programs.

Whether a given correlated point such as the correlated point 1206 is determined to be associated with a given image portion such as the image portion 1208 can depend upon various factors depending upon the embodiment. For example, whether the correlated point 1206 is determined to be associated with the image portion 1208 can be decided based upon whether the point 1206 is situated on/over (e.g., within the boundaries of) the image portion 1208, or alternatively whether the correlated point is either situated on/over or in close proximity to the image portion. Upon determining that the correlated point 1206 is associated with a given image portion such as the image portion 1208, the mobile device 102 at step 1306 selects that image portion and, if appropriate, further highlights that image portion to indicate the selection of that image portion. In alternate embodiments, instead of highlighting of the image portion 1208, another type of visual indication, audio indication, haptic indication, or other type of indication can be provided by the mobile device 102 that indicates that the image portion has been selected. It should be further noted that, in at least some embodiments, instead of or in addition to the above, the software implemented on the mobile device 102 is able to snap/pull in the finger estimated location to a nearest file for faster selection (e.g., move to grid).

Next, at step 1308, the first mobile device 102 further detects if the object sensed at step 1304 (e.g., the finger 1204) is moving away from, or out of proximity from, that mobile device. Assuming that the infrared sensing assembly 104 detects such movement (which is assumed to be the case in FIG. 13), the detecting of such movement serves as an indication to the first mobile device 102 that the data associated with the selected image portion 1208 is to be offered for transmission from the first mobile device 102 to the second mobile device 1202 which was paired at step 1302. Thus, upon the detecting of such movement, the first mobile device 102 in response (and as further indicated at step 1308) sends one or more signals to the second mobile device 1202 to indicate that the data associated with the selected image portion 1208 is being offered for transmission to the second mobile device. In another exemplary embodiment, after an image portion 1208 is highlighted by correlating the finger 1204 location with the image portion 1208 on screen, the image portion 1208 can be selected by holding the finger 1204 in place for a given time duration, signaling to the first mobile device 102 to notify the second mobile device 1202 that a file has been selected.

Such signals reflective of an offer for transfer can be transmitted using one or more of the aforementioned communication paths/links by which pairing was established at step 1302, such as Bluetooth, Wi-Fi, infrared communications, etc. In some embodiments, if the mobile device 102 is simultaneously paired with multiple other mobile devices, the above-described offer signal can be addressed to more than one other mobile device.

The sensing of the motion of an object (such as the finger 1204) away from the first mobile device 102 in step 1308 in the present embodiment is both intuitive and also serves a useful purpose. In particular, in this embodiment, no offer of data transmission is made by the first mobile device 102 unless the device 102 detects a particular movement that is expressly indicative of a user's desire to effect such an offer, and thus the mobile device 102 has a default operational mode of avoiding undesired, unauthorized offers of transmissions (or undesired, unauthorized transmissions upon acceptance of such offers). Nevertheless, while step 1308 shown in FIG. 13 envisions that an offer of data transmission will not be made unless and until the device 102 detects the object moving away from the first mobile device 102, in at least some alternate embodiments the first mobile device 102 sends signal(s) offering any data selected at step 1306 for transmission to the second mobile device 1202 as soon as that data is selected at step 1306, without requiring any additional sensing of object motion away from the first mobile device 102.

Still referring to FIG. 13, subsequent to step 1308 at step 1310, the first mobile device 102 starts a countdown timer and awaits a response to the offer made in step 1308 from the second mobile device 1202 with which it is paired. The countdown timer establishes a time period that is intended to be the maximum allowable time that the first mobile device will wait to receive signal(s) back from the mobile device 1202 with which it is paired indicating that the offer of data transmission has been accepted (that is, indicating a request on the part of the mobile device 1202 that the offered data be sent, which is a form of a handshake between the two mobile devices). The time period can be preconfigured, and can enhance security by reducing the chance of an inadvertent data transmission insofar as the time period during which a data transmission can occur is limited.

After the countdown timer has begun operation at step 1310, the first mobile device 102 at a subsequent step 1312 then determines whether the predetermined amount of time established by the countdown timer has elapsed. If so, the process returns to step 1304, at which the first mobile device 102 begins anew the sensing of the presence and movement of an object relative to the video screen 106. If not, the process advances to a step 1314, at which the first mobile device 102 determines whether an acceptance (or data request) signal has been received back from the second mobile device 1202 in response to the offer signal transmitted at step 1308. If no such request is received, the process returns to step 1312 at which the first mobile device 102 again determines whether the predetermined amount of time established by the countdown timer has elapsed. In at least some embodiments, the steps 1312 and 1314 can be implemented using interrupt signals. If an acceptance signal has been received as determined at step 1314, then the process advances to step 1316, where the first mobile device 102 transfers the requested data to the second mobile device 1202. Such transmission can again be accomplished via any of the Bluetooth, Wi-Fi, or infrared (or other) communication links between the paired mobile devices 102, 1202. Upon completion of the data transmission, the process from the standpoint of the first mobile device 102 is ended, at an end step 1318, albeit the process can in some cases be repeated by, for example, returning to steps 1300 or 1304.

During the performing of steps 1304-1314 by the first mobile device 102, and subsequent to the pairing of the mobile devices 102, 1202 at steps 1302, 1322, the second mobile device 1202 is simultaneously operating to detect movement of objects by way of a sensor assembly 1209 of its own. Detection of an object such as the finger 1210 is considered an indication of a desire on the part of the user of that mobile device (who can, but need not, be the same as the user of the first mobile device 102) to accept any data transmission offer from the first mobile device. Thus, as shown in FIG. 13, subsequent to the completion of step 1322, at step 1324 the offer signal sent at the step 1308 by the first mobile device 102 is received by the second mobile device 1202. Once this has occurred, at step 1326 the second mobile device 1202 can provide an indication that the offer signal has been received or information regarding the offer signal that has been received. For example, the second mobile device 1202 can display offer information such as identification information regarding the first mobile device 102 that has transmitted the offer, the name of a user of the first mobile device, an offered data file name, a remaining amount of time for an acceptance of the offer to be received by the first mobile device, etc. The performance of step 1326 is optional and need not occur in all circumstances.

Following step 1326 (or step 1324 when step 1326 is not performed), at step 1328 the second mobile device 1202 determines whether an indication of user acceptance of the offer has been received. In at least some embodiments, such user acceptance is determined by the second mobile device 1202 to have occurred if that mobile device has sensed an object such as the finger 1210 to have been within proximity of that mobile device (or more particularly a video screen 1211 of that mobile device). Such proximity detection can again be made via an infrared pyramid (or other infrared) sensing assembly, but can alternately be made in other manners, for example, via camera detection, voice control, keypress, accelerometer-detected tap, touchscreen interaction, etc. It should be further noted that, in at least some embodiments, the object sensed by the mobile device 1202 can be the same object (e.g., the same finger of the same hand) that is sensed by the mobile device 1202. This is particularly common in certain contexts, for example, if a user wants to transfer a song, while it is playing, the user can move his or her hand from the playing mobile device to a receiving mobile device.

If an indication of user acceptance has not yet been detected at step 1328, then the process at step 1330 further determines whether a time window for receiving such an indication has expired yet. If the time window has already expired as determined at step 1330, then the process ends at step 1336, and consequently the offer from the first mobile device 102 is not accepted (such that no further action in response to that offer occurs). If the time window has not yet expired as determined at step 1330, then the process returns to step 1326 (or, alternatively, directly to step 1328). Thus, in such circumstance, the mobile device 1202 continues to wait for an indication of user acceptance to occur.

Assuming that an indication of user acceptance of the data transmission offer signal has been detected at step 1328, then the second mobile device 1202 sends an acceptance (or data request) signal at step 1332. Further, assuming that the first mobile device 102 receives the acceptance signal at step 1314 prior to the expiration of the time period as determined at step 1312, then the first mobile device 102 in turn sends the offered data at step 1316 and correspondingly at step 1334 the second mobile device 1202 receives the data. The transmission of the data between the paired mobile devices 102, 1202 can be performed along one or more of several communication pathways available, for example, Bluetooth, Wi-Fi, or infrared (or other) communication links. In at least some embodiments, the communications can occur via infrared signals that are generated and received by the sensing assemblies 104, 1209, with such infrared signals further in some cases being reflected off an intermediate object such as the hand 111 as the signals are transmitted between the mobile devices. Indeed, infrared signals as transmitted and received by the sensing assemblies 104, 1209 can be used in some embodiments for any one or more of the (i) pairing of the mobile devices, (2) sensing of the presence and movement of objects in relation to the mobile devices, (3) communicating offer and acceptance (e.g., handshake) signals between the mobile devices, and (4) transmitting data between the mobile devices.

Upon receiving the data at step 1334, the process performed by the second mobile device 1202 is then completed, at an end step 1336, albeit in some cases the process is then repeated by the second mobile device 1202, by returning to step 1320 or step 1324. It will be understood that the same process as described above in relation to FIG. 13 can be also performed equally as well to cause a transfer of data from the second mobile device 1202 to the first mobile device 102.

Figure 14:
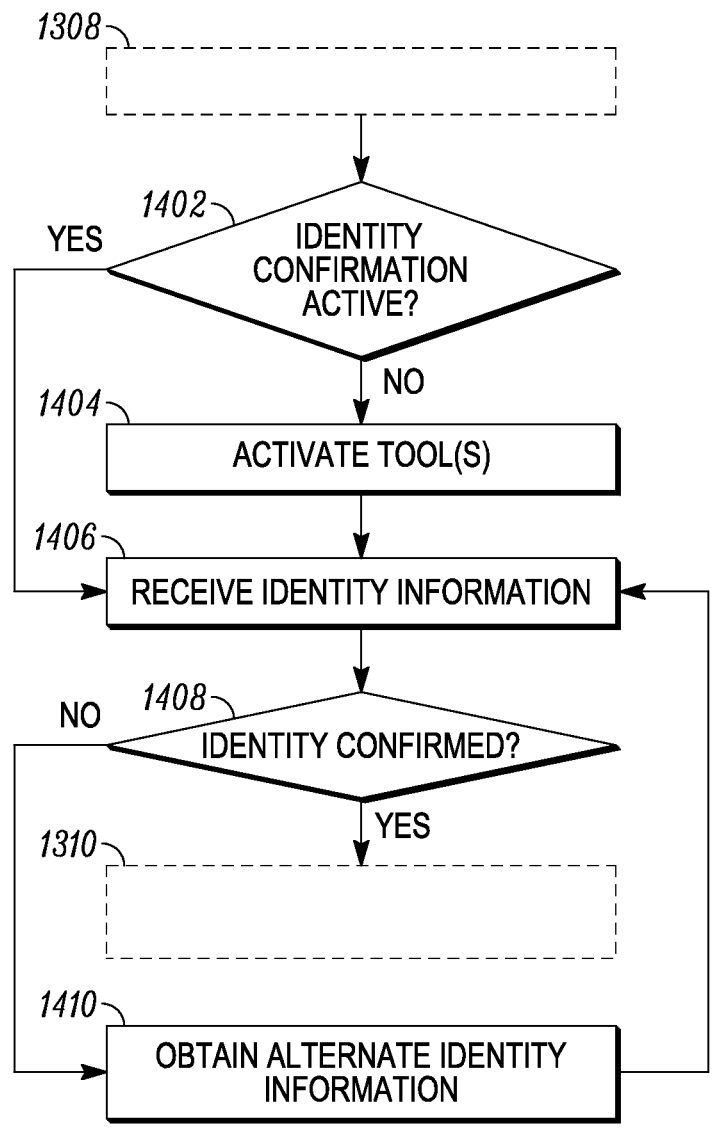
FIG. 14 is another flow chart illustrating exemplary steps of operation in accordance with at least some embodiments.

Referring further to FIG. 14, although not provided in all embodiments, in some embodiments the operation of the first mobile device 102 includes certain additional steps to further enhance security, particularly additional steps involve requesting and confirming identity information from a user (or possibly more than one user) prior to data transmission. Identity confirmation can occur at any of a variety of different times depending upon the embodiment, although in at least one embodiment as shown in FIG. 14 such confirmation occurs between steps 1308 and 1310 of FIG. 13. More particularly as shown, subsequent to step 1308 (shown in FIG. 14 in phantom), at step 1402 the first mobile device 102 determines whether one or more identity confirmation tools, such as facial recognition, finger print confirmation, voice analysis confirmation, gesture confirmation, or security code confirmation, have been activated (e.g., in accordance with a previously-provided command that can be provided during initial setup of the mobile device). If not, then one or more appropriate identity confirmation tool(s) are activated at step 1404. Although not specifically shown in FIG. 2, it should be understood that the first mobile device 102 can include (e.g., as among the input devices 210) suitable components that are employed as those identity confirmation tools, for example, a video camera capable of taking pictures of a person's face, a finger-print reader, a voice analyzer, etc., as well as additional components and/or software capable of being implemented on the processor 204 of the mobile device (e.g., facial recognition software, etc.).

Once the tool(s) are activated at step 1404, or if such tool(s) are already determined to be active at step 1402, then the process further advances to step 1406. At step 1406, the first mobile device 102 receives identity information appropriate for the activated tool(s). Thus, for example, if a finger-print confirmation tool is utilized, then the mobile device at step 1406 obtains an electronic image of a finger-print of a user via a finger-print reader of the mobile device 102. Alternatively, if facial recognition is used, an image of the face of the user of the mobile device is obtained. Upon receiving such appropriate information, at step 1408 the first mobile device 102 compares the received information with expected identity information to determine whether the identity information received from the user matches information stored by the mobile device 102 concerning one or more expected (or approved) user identity/identities. If the received identity information matches the stored identity information, the identity is confirmed at step 1408 and thus the process advances to step 1310 (shown in FIG. 14 in phantom).

However, if the received identity information is not confirmed during step 1408, the mobile device 102 proceeds to a step 1410, at which a different form of identity information is received. For example, if fingerprint or facial recognition techniques did not confirm the proper identity of the user, then at step 1410 a security code is entered by the user. Upon the entry of this information, the process again returns to steps 1406 and 1408, at which it is determined whether the proper identity has been received and confirmed. Thus, if a user's identity is properly confirmed then step 1310 and subsequent steps of the process shown in FIG. 13 can proceed while, if not, the process cannot advance. Although not shown, it will be understood that at least in some cases the entire process will terminate if a user's identity cannot be confirmed (e.g., within a particular number of failed attempts by the user to provide suitable information). In any event, should identity confirmation not be possible, step 1316 of FIG. 13 will not be performed and thus no data will be transferred from the first mobile device 102.

While FIG. 12 particularly shows the mobile devices 102, 1202 to be smart phones, as discussed above, numerous other embodiments involving communications between a variety of other types of electronic devices (and/or between other types of mobile devices and non-mobile devices) are also intended to be encompassed herein. For example, mobile device 1202 can instead be replaced with a non-mobile device such as include a desktop computer, a gaming console, or a digital video recorder (DVR), with any of these devices including a Bluetooth or other wireless communications capability. Further, depending upon the embodiment, a variety of sensing assemblies/sensing devices, including any of the previously-described sensing assemblies 104, 400, 500, 1000, 1100, and 1209 and others as well, can be used to sense movement of an object such as a hand or finger in relation to these various mobile device (or portion(s) thereof). For example, referring to FIG. 15, another type of mobile device, shown to be a laptop computer 1502, is shown to have four infrared transceivers 1504, 1506, 1508, 1510 respectively positioned at four corners of a video screen 1505 of the computer, which together can be considered to form a sensing assembly 1516 situated about the perimeter of the screen. Such a sensing assembly can likewise be utilized on a PDA similar to the mobile devices 102, 1202. Further for example, referring to FIG. 16, a PDA 1612 is shown to have a sensing assembly 1616 with four infrared transceivers 1640, 1642, 1644, 1648 respectively positioned at four corners of a video screen 1615 of the PDA.

Figure 15:
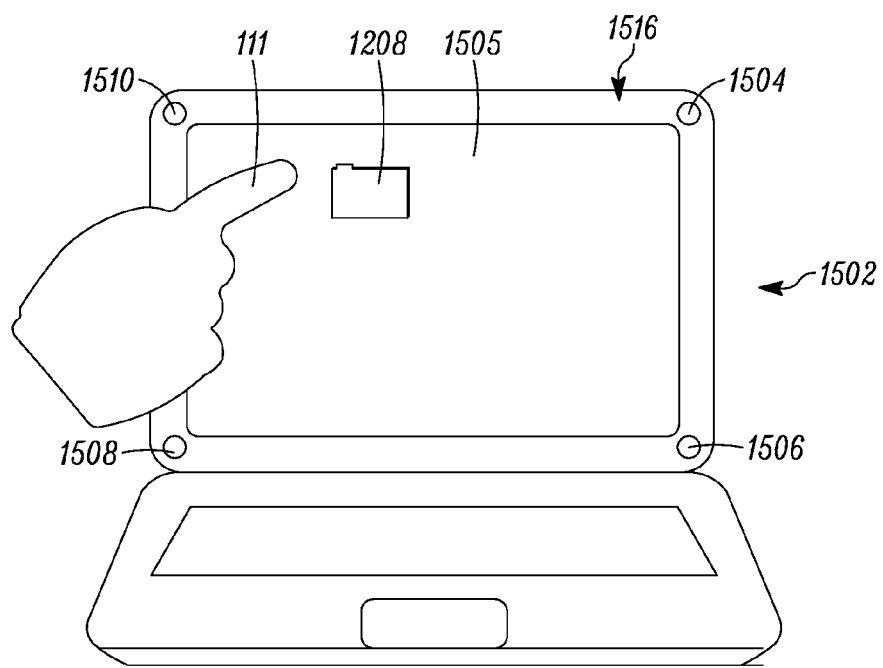
FIG. 15 is another front elevation view of an additional mobile device.
Figure 16:
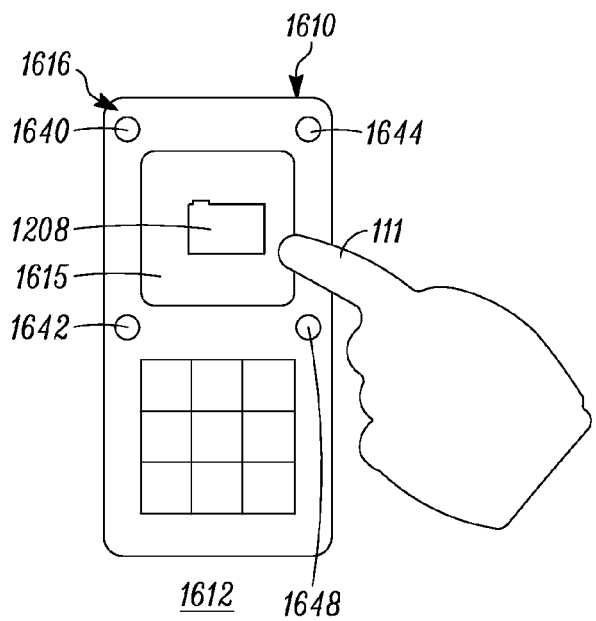
FIG. 16 is still another front elevation view of am additional mobile device.

Referring to both FIGS. 15 and 16, similar to the aforementioned sensing assemblies 104, 400, 500, 1000, 1100, and 1209, the sensing assemblies 1516, 1616 can determine the presence and position of objects 111 (e.g., fingers of hands as shown in FIGS. 15 and 16, respectively) placed within range of the respective sensing assemblies. More particularly, processors of the computer 1502 and PDA 1612 (e.g., processors such as the processor 204 of FIG. 2) can process infrared signals transmitted and received by the transceivers and use triangulation to determine the positions of the respective objects 111. Thus, the laptop computer 1502 and PDA 1612 each can operate, in relation to another electronic device, in the same (or a substantially similar) manner as discussed above with respect to FIGS. 13 and 14. In particular, as in steps 1304-1308 of FIG. 13, the laptop computer 1502 and PDA 1612 each can (among other things) operate to sense the presence of the respective objects 111, and determine correlated points on the respective video screens 1505, 1615 toward which the respective objects are moving. Also, the laptop computer 1502 and PDA 1612 each can further determine that a respective icon or other image portion such as files on the respective video screens 1505, 1615 that are respectively located at (or near) the correlated points have been selected, send data transmission offers to other mobile devices, and, ultimately, transmit information associated with the selected icon/image portions 1208 to other mobile device (not shown) upon acceptance of the data transmission offers.

Additionally, notwithstanding the above discussion of infrared sensing assemblies, in additional embodiments, mobile device(s) can achieve communications involving operations such as those discussed above with respect to FIGS. 13 and 14 using other types of sensing assemblies, such as touch-sensitive screens or touch screens (not shown), buttons, or triggers (such as a trigger that senses a finger tapping). In one such embodiment involving a touch screen, the transmission of a data file can be performed in a manner similar to the process described with reference to FIGS. 13 and 14, with the exception that the selection of an image portion such as the image portion 1208 of FIG. 12 is performed when a user physically touches the touch screen of a transmitting mobile device with an object (e.g., the finger 1204 or a stylus). To the extent that an icon or other image portion is located at (or proximate) the location on the touch screen that has been touched, that icon or image portion is immediately identified as the selected image portion. In addition, in an embodiment where the receiving mobile device also employs a touch screen, a user can accept an offer to transmit data by sensing the touch of an object on a portion of its screen. In still further embodiments, motion imparted on and sensed (such as by the accelerometer) by the mobile devices, can also be used to trigger specific actions, for example, offering a data file for transfer and accepting the offer.

The aforementioned processes by which image portion(s) on a mobile device can be selected and associated data is then transferred to another mobile device can be performed not only between a first mobile device and a second electronic device, but also between a given mobile device and multiple other electronic devices (in at least some such cases, the transfers of data to each of the receiving electronic devices occurs simultaneously or substantially simultaneously). That is, in some embodiments, a user at a given mobile device can move an object in relation to the given mobile device as described above, so as to select an image portion and indicate a desire to transfer the associated data, and the performance of the motion(s) precipitates a transfer of the data not only to one other electronic device but instead to multiple other electronic devices.

For example, in one exemplary embodiment, a user, such as a teacher (or alternatively a presenter at a conference), can point to (select) data displayed on his or her mobile device's screen, and motion with his or her finger towards a group of students, each having a mobile device paired to the teacher's device, whereby the data is offered for transmittal. The students' mobile devices can receive the offer and then further each student can precipitate acceptance of the respective offer by providing a motion, such as a catching motion, adjacent the screen on the student's respective mobile device. In some embodiments where there are multiple possible destinations for a given file, the particular catching motion or other gesture can not only precipitate acceptance of the file, but also direct where the file is to be stored upon receipt. For example, supposing that a particular file to be transferred to a laptop computer of a student can be transferred either to a folder stored on the computer (as represented by a file folder icon displayed on the computer screen), or alternatively to a universal serial bus (USB) memory stick associated with that computer, then in that case the student can potentially direct the storage of that file at either the folder or the USB memory stick depending upon a direction of the gesture of the student (e.g., either toward the file folder icon or toward the USB memory stick).

Also, each student can additionally transmit files to their teacher, for example a homework assignment can be turned in via this manner. Although the transmission of such homework assignment files can be provided from each individual student to the teacher on a one-by-one basis (e.g., as discussed above with respect to FIG. 12), in other circumstances the mobile devices of the students and the mobile device of the teacher can be configured so that the mobile device of the teacher receives multiple homework assignment files from multiple students within a given time period window without the need for the teacher to repeatedly motion to the teacher's mobile device that each respective homework assignment file should be accepted. Processes such as these facilitate a controlled, yet simple, dissemination of data from a given mobile device to more than one other mobile device, as well as collection of data at the given mobile device from the multiple other mobile devices.

Additional embodiments besides those specifically discussed above are also intended to be encompassed herein. Not only is it possible to employ the above techniques to facilitate transmission of information between pairs or groups of mobile devices, but also in some additional embodiments the above techniques (or techniques similar thereto) can be used for transmission of information between one or more mobile device(s) and one or more fixed device(s).

Embodiments such as many of those discussed above can be advantageous in several respects. For example, in at least some circumstances, such techniques allow for a user to quickly and intuitively copy or move data between devices. Also, in at least some circumstances, use of the above techniques transforms the act of transferring a file or other data into a more intimate or personal experience than is conventionally the case when one merely watches a progress bar or checks one's email account to determine if data has been received. Use of the above-described techniques in at least some circumstances makes the process of receiving data into a simple, intuitive, easily-understood (even for persons who are not technically-oriented) process. Where a person desires to not receive particular data, then that person can ignore an offering by not making an appropriate gesture or keypress, and consequently that person will not receive the offered data. Further, while data cannot be transferred without a receiving party's consent, a receiving party also cannot receive data without a transmitting party's initiation of the process. In cases where data that is more sensitive is being transferred, then standard password/key challenges can be initiated before the transfer occurs.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of operating a first mobile device so as to achieve a transmission of data from the first mobile device to an additional electronic device, the method comprising:
    tracking a positional variation of a first object situated proximate a display screen of the first mobile device by determining locations of the first object over time using a pyramidal infrared sensing assembly of the first mobile device, wherein at least one of an infrared phototransmitter and an infrared photoreceiver is employed on an inclined surface of the pyramidal infrared sensing assembly;
    determining a point or region on the display screen based upon the tracked positional variation of the first object;
    identifying an image portion corresponding to the point or region, on the display screen, wherein the data is associated with the image portion;
    detecting if the first object is moving away from the first mobile device; and
    in response to detecting of moving away, from the first device, of the first object, transmitting the data from the first mobile device,
    whereby the data is capable of being received by the additional electronic device.

2. The method of claim 1, wherein the tracking includes sending and receiving infrared signals.

3. The method of claim 1, further comprising:
    sending or receiving at least one additional signal to pair the first mobile device with the additional electronic device, wherein the additional electronic device is a second mobile device.

4. The method of claim 1, further comprising:
    sending an offer signal from the first mobile device representative of an offer by the first mobile device to transmit the data.

5. The method of claim 4, further comprising:
    receiving an acceptance signal at the first mobile device, the acceptance signal being indicative of an acceptance by the additional electronic device of the offer represented by the offer signal.

6. The method of claim 5, further comprising, after the sending of the offer signal:
    commencing operation of a timer, wherein the transmitting of the data is performed if the acceptance signal is received prior to expiration of a time period determined by the timer.

7. The method of claim 1, wherein the first mobile device performs an identity confirmation operation by which an identity of a user of the first mobile device is confirmed, prior to the transmitting the data.

8. The method of claim 7, wherein the identity confirmation operation involves at least one of: facial recognition, security code entry, finger print confirmation, voice analysis confirmation, or gesture detection.

9. The method of claim 1, wherein the locations are determined in three-dimensional space.

10. A method of communication between the first mobile device and the additional electronic device that comprises the method of claim 1 and that further comprises:
 detecting at the additional electronic device a further position or a further manner of movement of a further object that is situated proximate the additional electronic device;
 receiving an offer signal at the additional electronic device from the first mobile device; and
 sending an acceptance signal from the additional electronic device for receipt by the first mobile device after the detecting at the additional electronic device and the receiving an offer signal.

11. The method of claim 10, further comprising:
 receiving the data from the first mobile device at the additional electronic device, wherein the additional electronic device is a second mobile device, and further comprising: additionally transmitting the data from the first mobile device to at least one further mobile device.

12. The method of claim 10, where the first object and the further object are the same.

13. A mobile device comprising:
 An infrared sensing assembly having:
  at least one infrared phototransmitter that supports a central transmission axis, and
  at least one infrared photoreceiver that supports a central reception axis that is offset by an angle from the central transmission axis;
 a display screen; and
 a processor at least indirectly in communication with each of the infrared sensing assembly, the display screen, and a memory device,
 wherein the processor upon receiving signals from the infrared sensing assembly determines a correlated point or region of the display screen corresponding to a position or manner of movement detected using the assembly, and further identifying an image portion displayed on the display screen that is at or near the correlated point or region; and
 wherein the mobile device further transmits first data available from the mobile device and corresponding to the image portion upon an additional condition being met, wherein the additional condition includes a moving away of an object from the mobile device.

14. The mobile device of claim 13, wherein the infrared sensing assembly comprises:
 a pyramid-type housing structure having a central surface and a plurality of outer surfaces each of which extends in an inclined manner away from the central surface;
 a plurality of first photoelectric devices, wherein each first photoelectric devices is positioned proximate to a respective one of the plurality of outer surfaces; and
 a second photoelectric device that is positioned proximate to the central surface,
 wherein either each of the first photoelectric devices is an infrared phototransmitter and the second photoelectric device is an infrared photoreceiver, or vice-versa,
 wherein each respective photoelectric device is oriented so as to correspond to the respective surface proximate to which the respective photoelectric device is positioned,
 wherein the infrared sensing assembly is operated so that infrared light is communicated between the second photoelectric device and at least two of the first photoelectric devices,
 whereby the position or manner of movement of the object can be determined based upon the communicated infrared light, which is reflected off of the object during transit.

15. The mobile device of claim 13, wherein the infrared sensing assembly comprises:
 a plurality of first photoelectric devices, wherein each respective first photoelectric device is positioned proximate to another first photoelectric device; and
 at least one second photoelectric device that is substantially centrally positioned about the plurality of first photoelectric devices,
 wherein either each of the plurality of first photoelectric devices is an infrared phototransmitter and the at least one second photoelectric device is an infrared photoreceiver, or vice-versa,
 wherein the infrared sensing assembly is operated so that infrared light is communicated between the at least one second photoelectric device and at least two of the plurality of first photoelectric devices, and
 whereby the position or manner of movement of the object can be determined based upon the communicated infrared light, which is reflected off of the object during transit.

16. The mobile device of claim 13, wherein the infrared sensing assembly includes a plurality of photoelectric devices situated at a plurality of positions about at least one of: a perimeter of the display screen, a perimeter of the mobile device, or an area inside the perimeter of the mobile device.

17. The mobile device of claim 13, wherein the infrared sensing assembly comprises:
 a plurality of discrete first photoelectric devices,
 a circuit board having a top surface with the first photoelectric devices situated flatly thereon; and
 a second photoelectric device situated substantially between the first photoelectric devices,
 wherein the first photoelectric devices include a top portion for receiving a microfilm proximate thereto,
 wherein the microfilm serves to optically bend an infrared beam projected from each first photoelectric device, and
 wherein either each of the first photoelectric devices is an infrared phototransmitter and the second photoelectric device is an infrared photoreceiver, or vice-versa.

18. The mobile device of claim 13, wherein the infrared sensing assembly comprises:
 a plurality of discrete first photoelectric devices,
 a circuit board having a top surface carrying the first photoelectric devices; and
 a second photoelectric device situated central to the first photoelectric devices,
 wherein the first photoelectric devices include a top portion that is tilted with respect to the top surface, and
 wherein either each of the first photoelectric devices is an infrared phototransmitter and the second photoelectric device is an infrared photoreceiver, or vice-versa.

19. The mobile device of claim 13, further comprising a component enabling verification of a user identity, the component including at least one of: a video camera by which an image of a user can be obtained, a finger-print reader, or a voice analyzer.

20. A method of operating a first mobile device so as to achieve a transmission of data from the first mobile device to an additional electronic device, the method comprising:
 detecting a position or manner of movement of a first object situated proximate a display screen of the first mobile device, wherein the detecting is performed by way of a pyramidal infrared sensing assembly, wherein at least one of an infrared phototransmitter and an infrared photoreceiver is employed on an inclined surface of the pyramidal infrared sensing assembly;

determining a point or region on the display screen, the point or region being determined based upon the detected position or manner of movement of the first object;

identifying an image portion corresponding to the point or region, on the display screen, wherein the data is associated with the image portion;

detecting if the first object is moving away from the first mobile device;

in response to detecting of moving away, from the first device, of the first object, transmitting an offer signal indicative of an offer by the first mobile device to send the data to the additional electronic device;

receiving an acceptance signal, the acceptance signal being indicative of a desire by the additional electronic device to receive the data; and transmitting the data from the first mobile device for receipt by the additional electronic device.

21. The method of claim 20, further comprising, after the transmitting of the offer signal:

commencing operation of a timer, wherein the transmitting of the data is performed when the acceptance signal is received prior to an expiration of a time period determined by the timer, and wherein the additional electronic device is a second mobile device.

\* \* \* \* \*